United States Patent

[11] 3,629,844

[72] Inventors Douglas E. Dancis
Putnam Valley;
Gerald E. Dorfuss, White Plains; Benjamin C. Zitron, New York, all of N.Y.

[21] Appl. No. 41,795
[22] Filed June 1, 1970
[45] Patented Dec. 21, 1971
[73] Assignee Allied Management & Systems Corporation New York, N.Y.

[54] MULTIFUNCTION ROUTING NETWORK
23 Claims, 7 Drawing Figs.

[52] U.S. Cl. ........................................ 340/172.5
[51] Int. Cl. ........................................ G06f 9/19, G06f 3/00, G06f 15/56
[50] Field of Search ........................................ 340/172.5

[56] References Cited

UNITED STATES PATENTS 3,434,115 3/1969 Chomicki .................... 340/172.5
3,275,994 9/1966 Joseph .................... 340/172.5
3,350,687 10/1967 Gabrielson et al. ............ 340/172.5
3,495,220 2/1970 Lawson et al. ............ 340/172.5

*Primary Examiner*—Gareth D. Shaw
*Attorney*—Hubbell, Cohen & Stiefel

ABSTRACT: A multifunction routing network. The routing network is provided with a function control means including a condition responsive logic network having an iterative multifunction control loop. Register and memory means are also provided in the routing network which are operatively associated with the control means for providing input conditions thereto and for receiving output conditions therefrom. The logic network is provided with a multistable means having a plurality of states and is responsive to the states thereof and the input conditions thereto to provide a plurality of control functions of both a data control and an execute non-data control nature for the routing network. A computer, an input keyboard, an audiovisual playback device, and a television are also provided which are operatively associated with the register and memory means for providing input conditions thereto and for responding to output conditions therefrom.

INVENTORS
DOUGLAS E. DANCIS
GERALD E. DORFUSS
BENJAMIN C. ZITRON
BY Hubbell, Cohen & Stiefel
ATTORNEYS.

INVENTORS
DOUGLAS E. DANCIS
GERALD E. DORFUSS
BENJAMIN C. ZITRON
BY Hubbell, Cohen & Stiefel
ATTORNEYS.

INVENTORS
DOUGLAS E. DANCIS
GERALD E. DORFUSS
BENJAMIN C. ZITRON
BY
ATTORNEYS.

INVENTORS
DOUGLAS E. DANCIS
GERALD E. DORFUSS
BENJAMIN C. ZITRON
BY [signature]
ATTORNEYS.

INVENTORS
DOUGLAS E. DANCIS
GERALD E. DORFUSS
BENJAMIN C. ZITRON
BY [signature]
ATTORNEYS.

INVENTORS
DOUGLAS E. DANCIS
GERALD E. DORFUSS
BENJAMIN C. ZITRON
BY
ATTORNEYS.

MULTIFUNCTION ROUTING NETWORK

BACKGROUND OF THE INVENTION

1. Field of the Invention

The present invention relates to control networks and more particularly to multifunction routing networks for linking information of either a data or a control nature with a plurality of means responsive thereto.

2. Description of the Prior Art

There are many prior art control networks which are capable of performing more than one function. However, these prior art networks increase in complexity as the number of functions desired to be performed by the network are increased. Furthermore, these networks are limited to either providing control functions which are solely of a data control nature if there is a data input to such a network, or solely of an execute nondata control nature if execute control signals and not data signals are input to the network. These networks are not capable of distinguishing between data control signals and execute nondata control signals if only one network is utilized and, therefore, two separate routing paths must be provided. This, in essence, requires two separate routing networks for the two types of signals, whose respective signal paths must be known in advance of receipt of the signal. In an attempt to overcome these problems, computers have been utilized employing elaborate program schemes in order to define which signal path the signal is to be routed along. However, these systems require that all information and control functions be routed through the computer thereby tying up expensive computer time.

SUMMARY OF THE INVENTION

A multifunction routing network is constructed which includes a multistable means having a plurality of states including an initial condition state. Means for changing the state of the multistable means is operatively associated in the routing network with the multistable means. The routing network further includes function control means having a plurality of input conditions and a plurality of output conditions. The output conditions include a data control signal output condition and an execute nondata control signal output condition. The function control means includes condition responsive logic means and enabling means for providing a clock pulse to enable the condition responsive logic means, the enabling means being operatively connected to the logic means. The multistable means is operatively connected to the logic means for providing an input condition thereto which is indicative of the state of the multistable means. The routing network further includes register means which are operatively connected to the control logic means for providing a register signal input condition and a register state input condition to the logic means. The register signal input condition includes a data signal input condition and a control signal input condition. Memory means, which have a memory state input condition including a data condition, are also included in the routing network. The memory is operatively connected to the register means and the function control logic means and is responsive to the data control signal output conditions. The function control output conditions are determined by the input conditions provided thereto and the state of the multistable means to provide a plurality of control functions. The condition responsive logic means is responsive to the clock pulse, the multistable means state, and the input conditions present during a particular state to provide either a data control or an execute nondata control signal output condition, or both, and a change state execute nondata control signal output condition. The state changing means is responsive to the change state output condition to change the state of the multistable means each time such output condition or conditions occur, the multistable means eventually returning to a state corresponding to the initial state whereby an iterative multifunction control loop is provided for the function control means. The iterative multifunction control loop is as follows. The condition responsive logic means is responsive to the clock pulse, the multistable means initial state, and the register state input condition for providing a first data control signal output condition and a change state first execute nondata control signal output condition. The register means is responsive to the first data control signal output condition. The state changing means is responsive to the change state first execute nondata control signal to change the multistable means to a second state. The logic means is responsive to the clock pulse, the multistable means second state, the register data signal input condition and the memory state input condition for providing a load memory third data control signal output condition and another change state second execute nondata control signal output condition. The memory means is responsive to the third data control signal output condition to place the memory in the data condition. The state changing means is responsive to the change state second execute nondata control signal output condition to change the multistable means to a third state. The logic means is responsive to the clock pulse, the multistable means third state and the register signal condition for providing a fourth data control signal output condition responsive to the register data signal input condition, and a third execute nondata control signal output condition responsive to the register control signal input condition; and for providing another change state fourth execute nondata control signal output condition. The state changing means is responsive to the change state fourth execute nondata control signal output condition to change the multistable means to a fourth state, the fourth state corresponding to the initial state whereby the iterative multifunction control loop is provided.

DETAILED DESCRIPTION OF THE PREFERRED EMBODIMENTS

General Description

Figure 1:
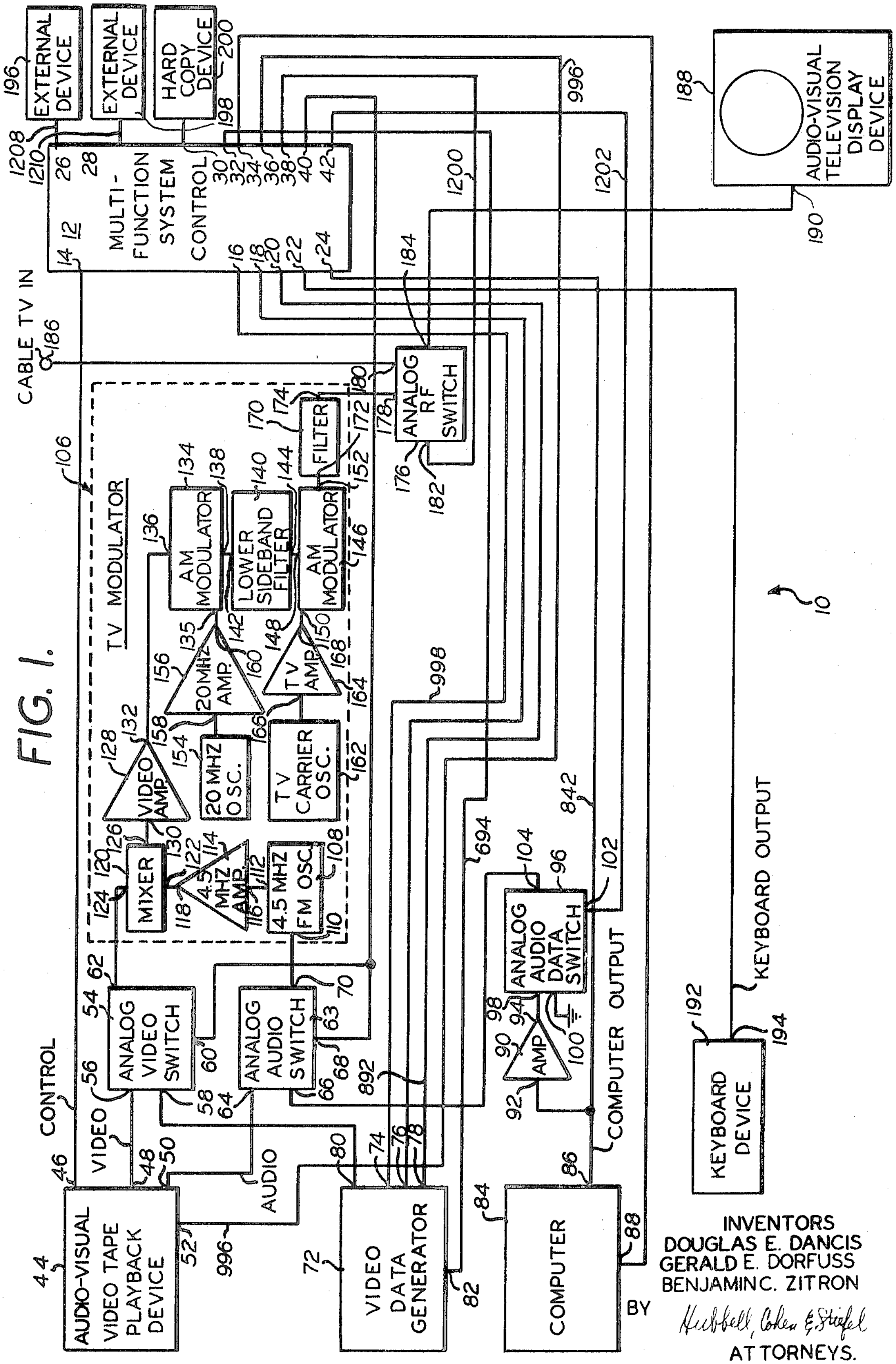
FIG. 1 is a block diagram of the network of the present invention.

Referring now to the figures in detail, FIG. 1 is a block diagram of a multifunction routing network, generally referred to by the reference numeral 10, constructed in accordance with the preferred embodiment of the present invention. For ease of understanding, the overall routing network 10 will be initially described in general and then the various portions thereof in greater detail.

The routing network 10 preferably includes a multifunction system control 12, having a plurality of inputs, illustratively shown as comprising six such inputs 14, 16, 18, 20, 22, and 24, and a plurality of outputs, illustratively shown as comprising nine such outputs 26, 28, 30, 32, 34, 36, 38, 40, and 42. An audiovisual playback device, which preferably is a conventional video tape multitrack playback device 44 capable of playback of a multitrack video tape (not shown), and which will not be described in greater detail hereinafter, is connected to the multifunction system control 12 in a manner to be described in greater detail hereinafter. Suffice it to say, the video tape playback device 44 preferably includes at least three playback channels 46, 48, and 50; one channel 46 being an execute nondata control signal channel and being connected to input 14 of the multifunction system control 12, another channel 48 being a video data channel, and the third channel 50 being an audio data channel. Preferably, the playback device 44 also includes a control input channel 52 for a purpose to be described in greater detail hereinafter.

Figures 3, 4:
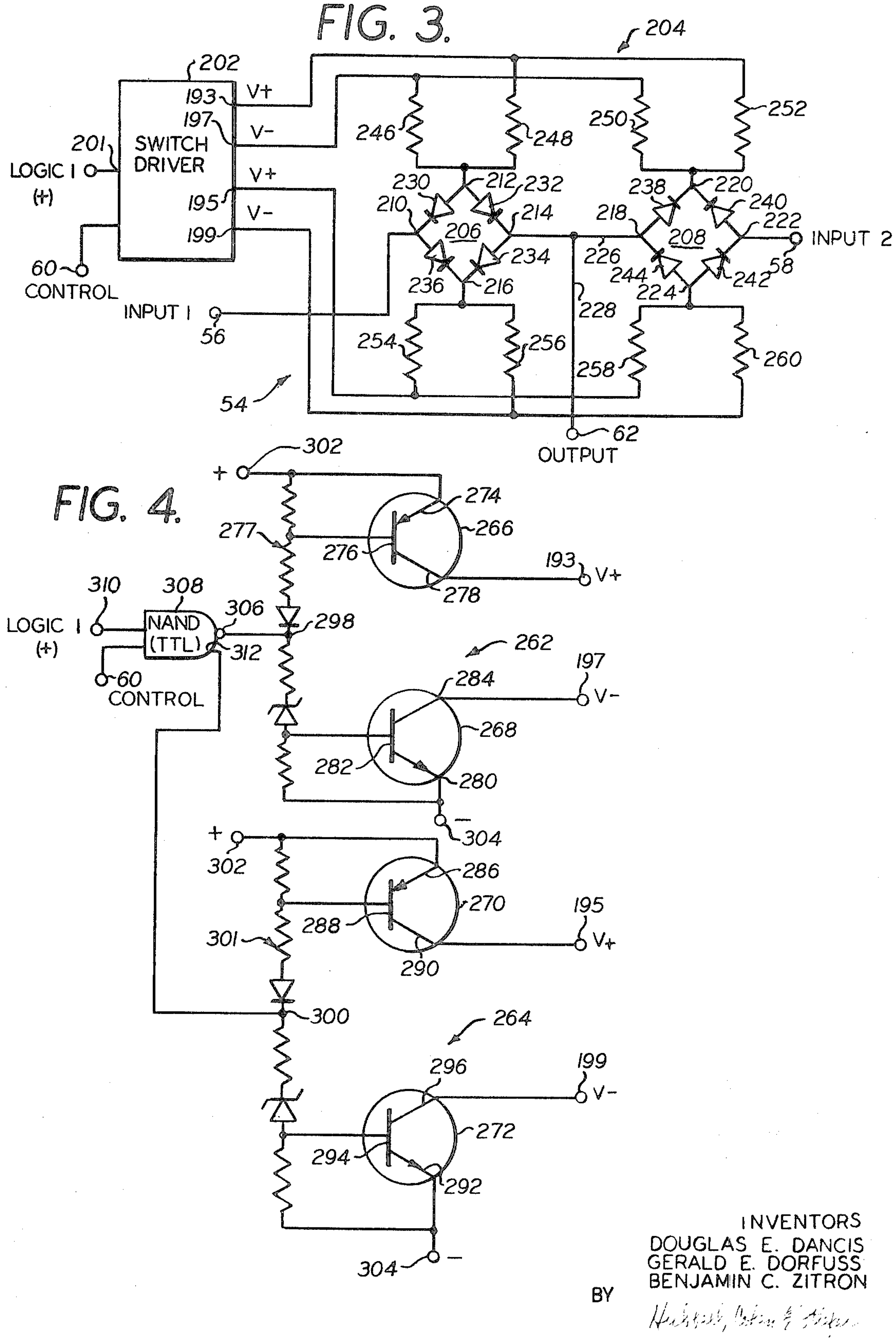
FIG. 3 is a schematic diagram, partially in block, of a typical analog switch portion of the network shown in FIG. 1.
FIG. 4 is a schematic diagram of the switch driver portion of the network shown in FIG. 3.

As presently preferred, the routing network 10 further includes an analog video switch 54, having a pair of data signal inputs 56 and 58, a data control input 60, and a data signal output 62; and an analog audio switch 63 having a pair of audio data signal inputs 64 and 66, a data control input 68, and a data signal output 70. Preferably, analog switches 54 and 63, the circuitry thereof to be described in greater detail hereinafter, and shown in greater detail in FIGS. 3 and 4, are identical in structure and operation, only differing in the inputs thereto and outputs therefrom. The video data channel 48 of playback device 44 is connected to one data signal input 56 of the analog video switch 54, and the audio data channel 50 of playback device 44 is connected to one data signal input 64 of the analog audio switch 63.

A video data generator 72 for generating a video display of data information of, preferably, a digital type, in a manner to be described in greater detail hereinafter, has a plurality of data control signal outputs, illustratively shown as three such outputs 74, 76 and 78, connected to multifunction system inputs 16, 18 and 20, respectively; a video data signal output 80, connected to the other input 58 of the analog video switch 54, and a data signal input 82, connected to output 32 of the multifunction system 12. The circuitry associated with the video data generator 72 will be described in greater detail hereinafter.

Figure 2:
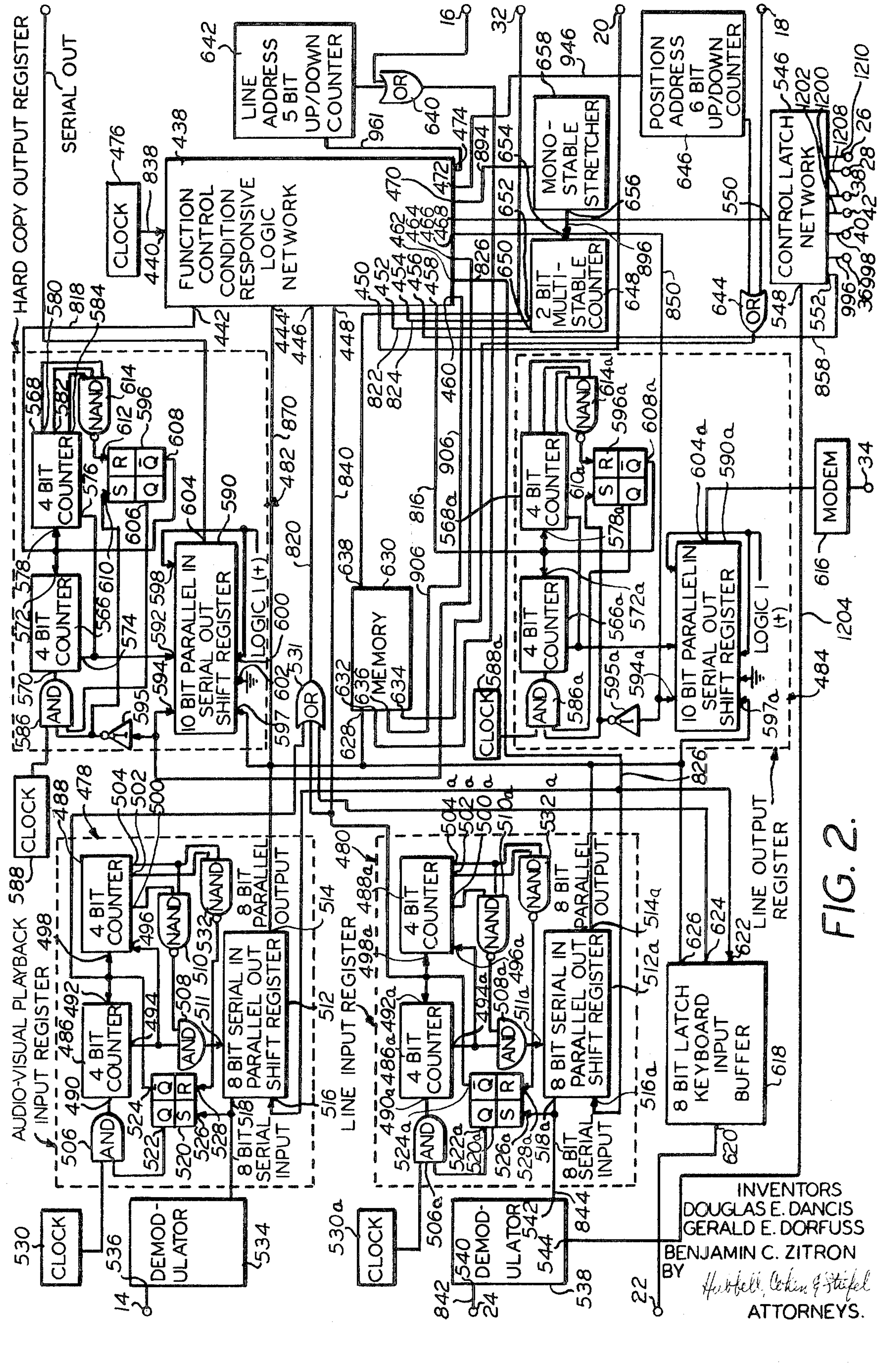
FIG. 2 is a block diagram of the multifunction system control portion of the network of FIG. 1.

A general purpose computer 84, such as any conventional computer which preferably provides both an audio output and a digital output, such as an IBM 360 in conjunction with an audio response unit such as an IBM 7770, has a data signal output 86, and a data signal input 88 connected to multifunction system control 12 via a communications line, such as a bidirectional telephone line illustratively shown in FIGS. 1 and 2 as comprising two separate paths, one being an input path and the other being an output path. The data signal output 86 is connected in parallel to input 24 of the multifunction system control 12 via the output path, and the data signal input 88 is connected to output 34 of multifunction system control 12 via the input path. Preferably, a conventional amplifier 90, illustratively shown as being an operational amplifier having an input 92 and an output 94 has its input 92 connected in parallel to the computer output 86. An analog audio data switch 96, preferably identical in structure and principle of operation to analog switches 54 and 63, has a pair of data signal inputs 98 and 100, with input 100 preferably being connected to ground and input 98 being connected to the data signal output 94 of amplifier 90; a data control input 102 connected to output 42 of the multifunction system control 12; and a data signal output 104 connected to the other input 66 of the analog audio switch 63.

A conventional television, or TV modulator network, generally referred to by the reference numeral 106, is also included in routing network 10 for a purpose to be described in greater detail hereinafter. The conventional TV modulator network 106 preferably includes a 4.5 megahertz FM oscillator 108 having an input 110 and an output 112 with the input 110 being connected to the output 70 of analog audio switch 63; a 4.5 megahertz amplifier 114, illustratively shown as being an operational amplifier, having an input 116 and an output 118, with the input 116 being connected to the output 112 of oscillator 108; and a mixer 120, having inputs 122 and 124 and an output 126, with the inputs 122 and 124 being connected to output 118 of amplifier 114 and output 62 of analog video switch 54, respectively. A video amplifier 128 having an input 130 and an output 132 is also included in modulator network 106, with input 130 being connected to output 126 of mixer 120. An AM modulator 134 having inputs 135 and 136 and an output 138 has the input 136 thereof connected to the output 132 of video amplifier 128. A lower sideband elimination filter 140, having an input 142 and an output 144 is connected to the output 138 of AM modulator 134 at input 142. Another AM modulator 146, similar to AM modulator 134, having inputs 148 and 150, and an output 152 is also included in network 106. Input 148 is connected to output 144 of filter 140. A conventional 20 megahertz oscillator 154 and a 20 megahertz amplifier 156, having an input 158 and an output 160 are connected together with the input 158 of amplifier 156 connected to the output of oscillator 154 and the amplifier output 160, connected to the input 135 of AM modulator 134. A conventional TV carrier oscillator 162, and a TV amplifier 164 having an input 166 and an output 168 are connected together with amplifier input 166 connected to the output of the TV carrier oscillator 162, which is an oscillator tuned to a frequency 20 megahertz below the TV carrier frequency, and amplifier output 168 connected to the input 150 of AM modulator 146. A filter 170 having an input 172 and an output 174 with the input 172 connected to AM modulator output 152 is included in network 106 as the output stage thereof.

An analog Radio Frequency, or RF, switch 176, which, preferably is identical in structure and principle of operation with the previously discussed analog switches 54, 63 and 96 and having a pair of RF data signal inputs 178 and 180, a data control input 182 and a RF data signal output 184, is connected to filter output 174 at input 178 and to the multifunction system control output 38. Preferably, a cable television input terminal 186 is connected to input 180 of analog switch 176 for providing a CATV RF input if desired. Preferably, a conventional audiovisual television display device 188, such as a commercial home television receiver, having an input 190, has the input 190 thereof connected to the output 184 of the analog RF switch 176.

An input data device, which is preferably a conventional keyboard device 192 with the key indicia modified in any desired manner, having an output 194, is connected to input 22 of multifunction system control 12 at the output 194 thereof, for a purpose to be described in greater detail hereinafter.

The balance of the multifunction system control output terminals 26, 28 and 30 are connected to external devices 196 and 198, which may be any conventional external devices which are responsive to a control signal, such as conventional home appliances, and to a conventional hard copy device 200, such as a conventional computer output line printer, respectively.

Analog Switch Circuitry

Referring now to FIGS. 3 and 4, a detailed schematic diagram of a preferred analog switch configuration which is, preferably, utilized for each of the analog switches 54, 63, 96 and 176 is shown. For purposes of illustration, the analog switch configuration will be described with reference to the analog video switch 54 with the modifications thereto for analog switches 63, 96 and 176 being described hereinafter. Analog video switch 54 includes a switch driver 202, preferably having a pair of positive potential output terminals 193 and 195, a pair of negative output terminals 197 and 199, and a positive logic "1" input terminal 201 in addition to the control input terminal 60; and an associated switching network, generally referred to by the reference numeral 204.

The switching network 204 preferably includes a pair of balanced diode bridges 206 and 208 each having four terminal points, 210, 212, 214 and 216 for bridge 206 and 218, 220, 222 and 224 for bridge 208. As was previously mentioned, the analog video switch 54 is conventional, having one input terminal 56 being connected to terminal 210 of bridge 206 and the outer input terminal 58 being connected to terminal 222 of the other bridge 208, with bridges 206 and 208 connected together by a path 226 between terminals 214 and 218. An output path 228 is connected in parallel between path 226 and output terminal 62. Diode bridges 206 and 208 each include four diodes 230, 232, 234 and 236 for bridge 206 and 238, 240, 242 and 244 for bridge 208. Bridge 208 is connected with the diodes 238, 240, 242 and 244 in opposite bias relationship to the diodes 230, 232, 234 and 236 of bridge 206 so as for the diodes of one bridge to be reverse biased when the diodes of the other bridge are forward biased. The switch driver output terminals 193 and 197, and 195 and 199 are connected in parallel with bridges 206 and 208 through parallel impedance pairs 246–248 and 250–252 to points 212 and 220, respectively, for output terminals 193 and 197, with terminal 193 being connected in parallel with impedances 248 and 252, and terminal 197 being connected in parallel with impedances 246 and 250; and through parallel impedance pairs 254–256 and 258–260 to points 216 and 224, respectively, for output terminals 195 and 199, with terminal 195 being connected in parallel with impedances 254 and 258, and terminal 199 being connected in parallel with impedances 256 and 260. Preferably, the value of parallel impedance pairs 246–248 and 254–256 are substantially equivalent as is the value of parallel impedance pairs 250–252 and 258–260.

Referring now to FIG. 3, the switch driver 202 is a conventional switch driver which, preferably, includes two balanced identical transistor pairs 262 and 264. Transistor pair 262 includes a pair of transistors 266 and 268, and transistor pair 264 includes a pair of transistors 270 and 272. The transistors 266, 268, 270 and 272 each have an emitter, base and a collector, transistor 266 having an emitter 274, a base 276 and a collector 278; transistor 268 having an emitter 280, a base 282 and a collector 284; transistor 270 having an emitter 286, a base 288 and a collector 290; and transistor 272 having an emitter 292, a base 294 and a collector 296. Bases 276 and 282 of transistor pair 262, and bases 288 and 294 of transistor pair 264 are operatively connected to a common voltage midpoint 298 for pair 292, and point 300 for pair 264. The emitter 274 of transistor 266 is connected to a source of positive potential, not shown, at point 302. The collector 278 of transistor 266 is connected to positive output terminal 193. The emitter 280 of transistor 268 is connected to a source of negative potential, not shown, at point 304, which is preferably equal but opposite in value to the positive source of potential at point 302. The collector 284 of transistor 268 is connected to negative output terminal 197. The common voltage midpoint 298 is, preferably, connected to the output 306 of a NAND-gate 308 which preferably is a typical transistor-transistor-logic (TTL) NAND gate having isolated complementary outputs 306 and 312 and including the control input 60, and another input 310 connected to a positive source of potential, not shown, equivalent to logic 1. The common voltage midpoint 298 is connected via a resistor-divider network 277 to bases 276 and 282 of transistors 266 and 268, respectively. The output 312 of NAND-gate 308 is connected to the common voltage midpoint 300, which midpoint 300 is in turn connected via a resistor-divider network 301 to bases 288 and 294 of transistors 270 and 272, respectively. Transistors 270 and 272 are, preferably, connected in the identical manner as transistors 266 and 268, and will not be described in greater detail, with the collector 290 of transistor 270 being connected to positive output terminal 195 and the collector 296 of transistor 272 being connected to negative output terminal 199. The balance of the circuitry associated with the switch driver 202 is conventional and will not be described in greater detail hereinafter, as it will be understood by one of ordinary skill in the art.

For the analog audio switch 63, input terminals 64 and 66 are equivalent to input terminals 56 and 58, respectively, control input 68 is equivalent to control input 60, and output 70 is equivalent to output 62; for the analog audio data switch 96, input terminals 98 and 100 are equivalent to input terminals 56 and 58, respectively, control input 102 is equivalent to control input 60, and output 104 is equivalent to output 62; and for analog RF switch 176, input terminals 178 and 180 are equivalent to input terminals 56 and 58, respectively, control input 182 is equivalent to control input 60, and output 184 is equivalent to output 62.

Video Data Generator Circuitry

Figure 6:
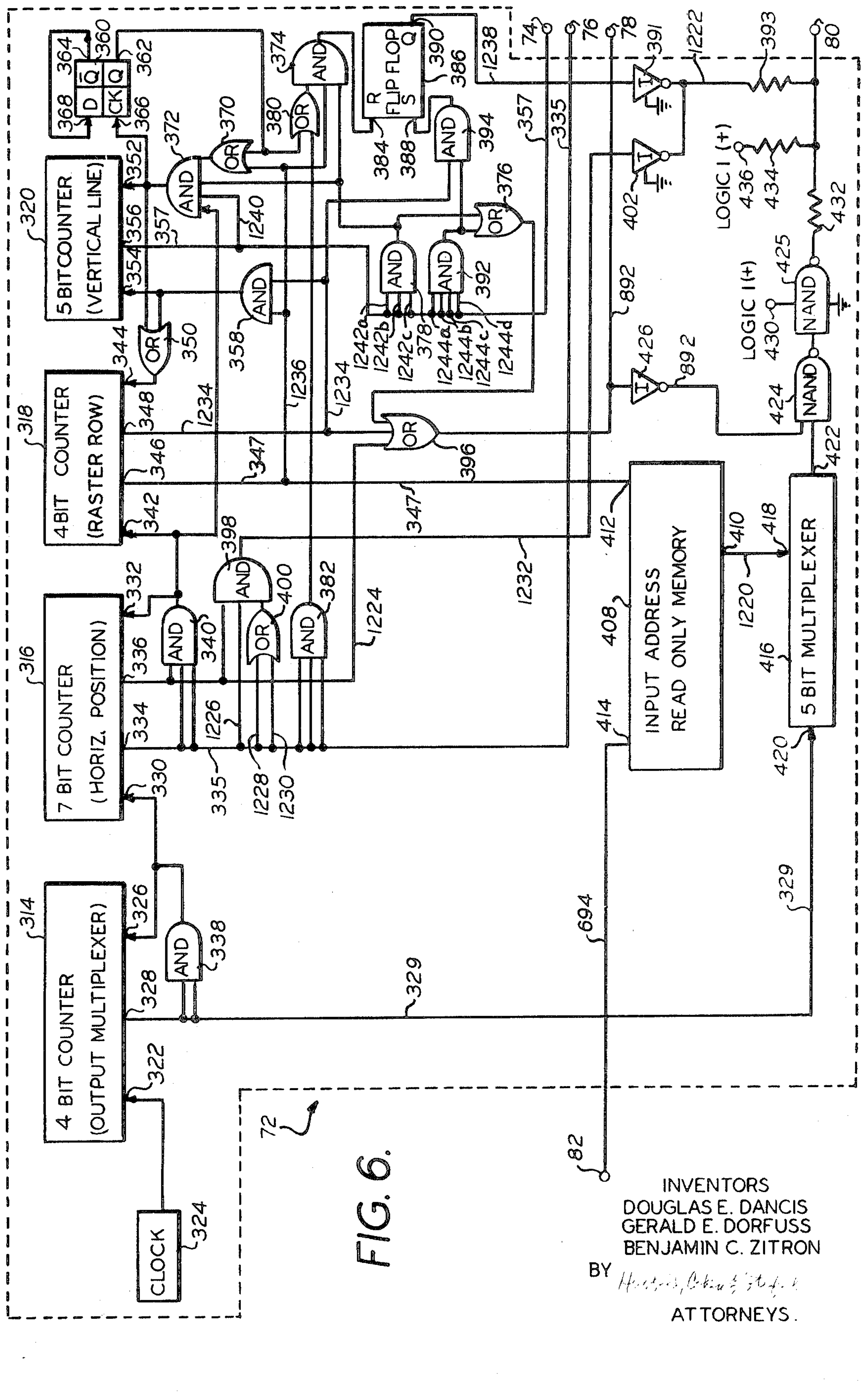
FIG. 6 is a block diagram, partially in schematic, of the video data generator portion of the network shown in FIG. 1.

Referring now to FIG. 6, and describing the video data generator 72 in greater detail, the video data generator 72, preferably includes a plurality of counters, illustratively shown as including four such counters 314, 316, 318 and 320 for controlling the various position parameters of a cathode-ray tube television electron beam to determine the scan position of the electron beam, in a manner to be described in greater detail hereinafter.

Counter 314 is a conventional four bit counter having an input terminal 322 connected to a conventional clock pulse source 324, such as an 8 megahertz source, a reset terminal 326 and an output terminal 328 which is illustratively shown as one terminal having a single output path 329 but which, preferably, represents three parallel bits of information on three separate parallel paths. The reset terminal 326 of the counter 314 is connected to an input terminal 330 of counter 316 which is preferably a seven bit counter which provides the horizontal scan position.

Counter 316 has a reset terminal 332, an output terminal 334, which preferably represents six parallel bits of information which are shown as having a single output path 335, but which represents six separate parallel paths, one for each bit, and an output terminal 336, which preferably represents the last, or seventh bit of information. Output terminal 328 of counter 314 is connected to the inputs of a two input AND-gate 338, to provide two bits of the three bit output to gate 338 whose output is connected in parallel to reset terminal 326 and input terminal 330 of counters 314 and 316, respectively. Output terminal 336 of counter 316 is connected in parallel to one input of a three input AND-gate 340 and to one input of a three input OR-gate 396. The other inputs of AND-gate 340 are connected in parallel with output terminal 334 to provide two bits of the six bit output to gate 340. The output of AND-gate 340 is connected to reset terminal 332 of counter 316, and to an input terminal 342 of counter 318, which is, preferably, a four bit counter which provides the raster row scan position, the terminals 332 and 342 being connected in parallel.

Counter 318 has a reset terminal 344, output terminal 346 which, preferably, provides three parallel bits of information on path 347 which represents three separate parallel paths, one for each bit, and a terminal 348 which, preferably, provides the last, or fourth bit of information. Reset terminal 344 of counter 318 is connected to the output of a two input OR-gate 350. OR-gate 350 has one input connected in parallel to a reset input 352 of counter 320, and to a clock terminal 366 of a conventional bistable flip-flop device 360. Counter 320, preferably, is a conventional five bit counter which determines the vertical line scan position, in a manner to be described in greater detail hereinafter.

Counter 320 has an input terminal 354 and a five parallel bit output terminal 356 which provides five parallel bits of information on path 357, which represents five separate parallel paths, one path for each bit. The input terminal 354 of counter 320 is connected to the other input of OR-gate 350 and in parallel to the output of a two input AND-gate 358. The reset terminal 352 of counter 320 is also connected to the clock terminal 366 of flip-flop device 360, illustratively shown as having, in addition to clock terminal 366, a Q state terminal 362, a $\overline{Q}$ state terminal 364, and a D or data terminal 368, with the $\overline{Q}$ terminal being connected in a feedback path to the D terminal 368. Reset terminal 352 of counter 320 is connected in parallel to the clock terminal 366 of flip-flop 360. The Q state terminal 362 is connected in parallel to one input of a two input OR-gate 370 whose output is connected to a four input AND-gate 372. The output of AND gate is in turn connected in parallel to reset terminal 352, OR-gate 350 and to clock terminal 366.

The other input to OR-gate 370 is connected in parallel with an input to AND-gate 358. The output of AND-gate 358 is connected in parallel to OR-gate 350 as well as to input terminal 354 of counter 320. The input to AND-gate 358 is also connected to an input to OR-gate 370 which is in turn connected in parallel to one bit of the three parallel bit output of output terminal 346 of counter 318. A second input of AND-gate 372 is connected in parallel to input 342 of counter 318, to the output of AND-gate 340, and to the reset terminal 332 of counter 316. A third input to AND-gate 372 is connected to one bit of the five bit parallel output of output terminal 356 of counter 320. A fourth input of AND-gate 372 is connected in parallel to an input to a three input AND-gate 374, an input to a two input OR-gate 376, and an output of a three input AND-gate 378.

AND-gate 374, which, preferably, includes three inputs, (two others in addition to the parallel connection to AND-gate 372) with one of the other inputs connected in parallel with an input to OR-gate 370, an input to AND-gate 358, said three parallel connected inputs being connected to output terminal 346 of counter 318. The remaining or third input to AND-gate 374 is connected to the output of a two input OR-gate 380, one of whose inputs is connected in parallel with the input to OR-gate 370 and the Q state output terminal 362 of flip-flop 360 and the other of whose inputs is connected to the output of an AND-gate 382. The inputs to AND-gate 382 are three bits from six bit output 334 of counter 316. The output of AND-gate 374 is connected to the reset or "R" terminal 384 of a conventional bistable flip-flop device 386 which also has a set or "S" terminal 388 and a Q state terminal 390. The Q state terminal 390 is connected through a conventional grounded logic inverter 391 and impedance 393 to output terminal 80. The inputs to AND-gate 378 are three bits from the five bit output terminal 356 of counter 320. OR-gate 376 has its other input connected in parallel to the output of AND-gate 392 and an input to gate 394, the output of gate 376 being connected to an input of a three input OR-gate 396. AND-gate 394 has another input connected in parallel to an input of AND-gate 358, an input to OR-gate 396 and to terminal 348 of counter 318, and has its output connected to the set or "S" terminal 388 of flip-flop device 386.

One of the other two input terminals of OR-gate 396 is connected to terminal 348 of counter 318, and the remaining input terminal to OR-gate 376 is connected to terminal 336 of counter 316 which is also connected to the other input to AND-gate 340 and an input to a three input AND-gate 398, respectively. In addition to the parallel connection of one input of AND-gate 398 to terminal 336, AND-gate 398, which, preferably, has three inputs, has one input connected to output terminal 334 of counter 316 and one input connected to output terminal 334 through an OR-gate 400, the output of AND-gate 398 being connected through another conventional grounded logic inverter 402 and impedance 393 to output terminal 80.

Terminal 346 of counter 318 is, preferably, connected to a conventional input-address Read-Only Memory 408 having a five bit output terminal 410, a three bit row address input terminal 412, which is the terminal connected to output terminal 346 of counter 138, and a seven bit ASCII character input terminal 414 connected to input terminal 82. The five bit output terminal 410 of memory 408 is connected to a conventional five bit multiplexer 416 having a five bit data input terminal 418, a three bit address input terminal 420 which is connected to three bit output terminal 328 of counter 314, and a one bit output terminal 422. The output terminal 422 is connected to one input of a two input NAND-gate 424, whose other input is connected through a logic inverter 426 to the output terminal of OR-gate 396 in parallel with output terminal 78. The output of NAND-gate 424 is connected to one input of three input NAND-gate 428 which has one terminal grounded and one terminal connected to a logic 1 input 430, and whose output is connected through impedance 432 in parallel to terminal 80, connected to a logic 1 input 436 through impedance 434, and the outputs of inverters 391 and 402 through impedance 393.

Output terminal 76 is connected to output terminal 334 of counter 316 and output terminal 74 is connected to output terminal 356 of counter 320, to provide the balance of the external connections for the video data generator 72.

Multifunction System Control Circuitry

Figure 5:
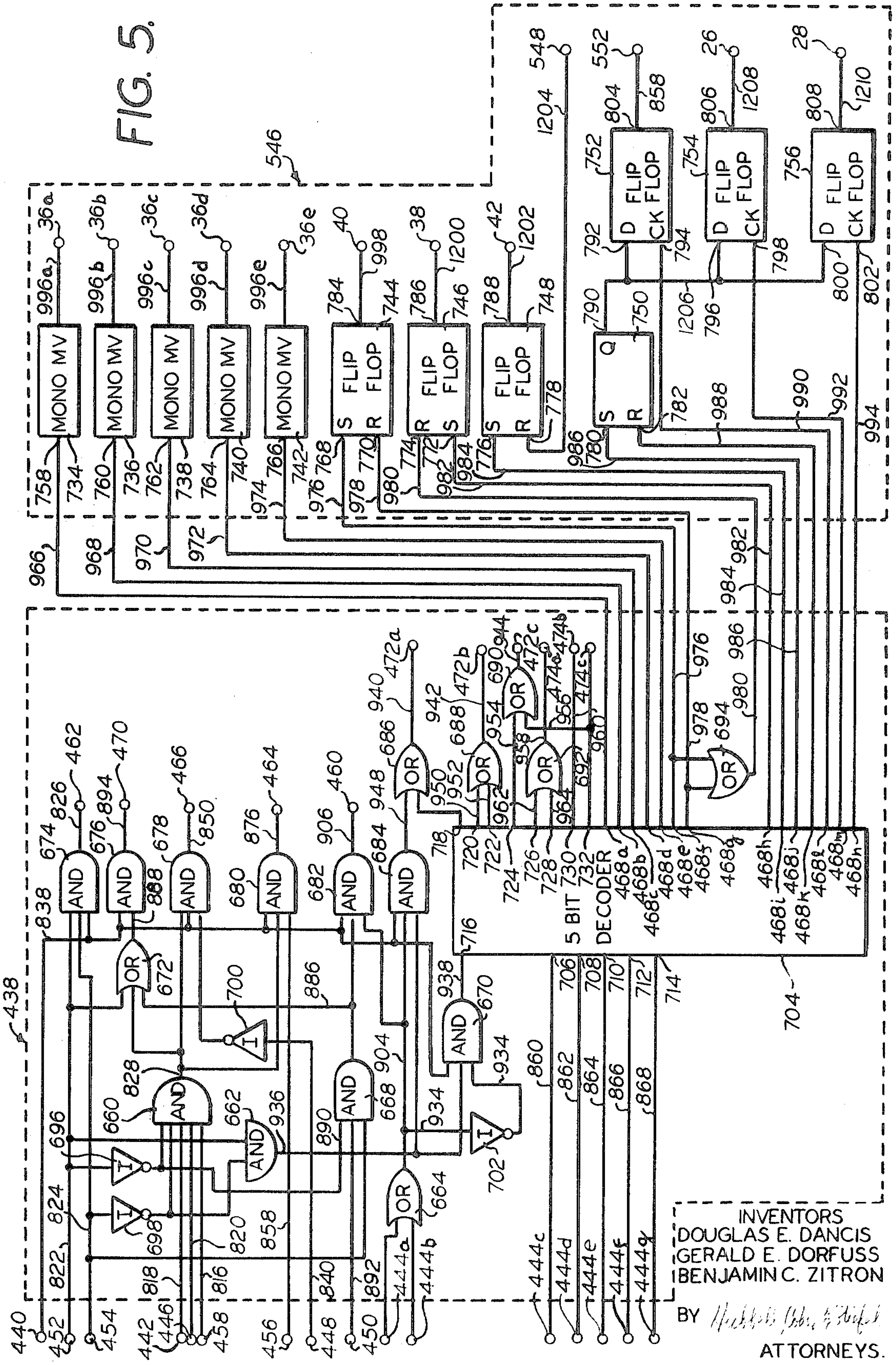
FIG. 5 is a block diagram of the function control logic and control latch portions of the network shown in FIG. 2.

Referring now to FIGS. 1, 2 and 5, and describing the multifunction system control 12 in greater detail, the multifunction system control 12 includes a function control condition responsive logic network 438 shown in block in FIG. 2 and in greater detail in FIG. 5. Network 438 has a plurality of input terminals illustratively shown as comprising ten such terminals 440, 442, 444, 446, 448, 450, 452, 454, 456 and 458 for supplying a plurality of input conditions to the function control network 438 for a purpose to be described in greater detail hereinafter, and a plurality of output terminals, illustratively shown as comprising eight such terminals 460, 462, 464, 466, 468, 470, 472 and 474. Input terminal 450 is connected to input terminal 20 of the multifunction system control 12 which is in turn connected to output terminal 78 of video data generator 72 (FIG. 1). As shown in FIG. 5, a clock pulse source 476, which may be any conventional clock pulse source, is connected to input terminal 440 of the function control network 438 for interrogating or enabling the network 438 in a manner to be described in greater detail hereinafter.

As shown and preferred, two input registers 478 and 480, and two output registers 482 and 484 are connected to the function control network 438 whose internal circuitry will be described in greater detail hereinafter. The input register 478 is connected in parallel to input terminals 444 and 446 and output terminal 462 of the logic network 438. Input register 480 is connected in parallel to input terminals 444, 446 and 448 and output terminal 462 of the logic network 438. Output register 482 is connected to input terminal 442 and in parallel with input registers 478 and 480 to input terminal 444, and to output terminal 464 of the network 438; and output register 484 is connected in parallel to input terminal 444, input terminal 458, and to output terminal 466 of the logic network 438.

Preferably, the input registers 478 and 480 are structurally identical, although they may be different if desired without departing from the invention, and the output registers 482 and 484 are also preferably structurally identical, although they may also be different if desired without departing from the invention. Both input registers 478 and 480 and output registers 482 and 484 are preferably conventional digital registers. By way of example, both input registers 478 and 480 and output registers 482 and 484 are, preferably, designed to handle eight bits of digital information. This is not restrictive as to the capacity of the system, but is merely exemplary of the preferred embodiment and any desired digital capacity may be employed by substituting registers having different capacities from those of the registers 478, 480, 482 and 484.

Now describing the input register 478 in greater detail, the other input register 480 being identical therewith, with identical components having the same reference numeral followed by a subscript "*a*." The input register 478 as shown and preferred, includes a pair of conventional four bit counters 486 and 488, counter 486 having an input terminal 490, a reset terminal 492 and an output terminal 494, and counter 488 having an input terminal 496, a reset terminal 498 and a plurality of output terminals, illustratively shown as comprising three such terminals 500, 502 and 504. The reset terminals 492 and 498 of the counters 486 and 488 are connected together, and the output terminal 494 of counter 486 is connected to the input terminal 496 of counter 488. A logic gate, which is preferably a two input AND-gate 506 has the output thereof connected to the input terminal 490 of counter 486. The output terminal 494 of counter 486 is, preferably, connected in parallel as one input to a two input AND-gate 508. The other input of the AND-gate 508 is connected to the output of a two-input NAND-gate 510 whose inputs are connected to output terminals 500 and 502 of counter 488, respectively. The output of AND-gate 508 is connected as a clock input to a clock input terminal 511 of a conventional eight bit Serial In-Parallel Out shift register 512, whose eight bit parallel output is illustratively represented by a single output terminal 514.

The shift register 512, preferably, has a clear input terminal 516 and a serial data input terminal 518 in addition to the clock input terminals 511 and parallel output terminal 514. The parallel output terminal 514 is connected to the input terminal 444 of the function control logic network 438; and the clear input terminal 516 is connected to output terminal 462 of the function control logic network 438. A conventional bistable flip-flop 520, which is illustratively shown as having four terminals Q522 and $\overline{Q}$524 which represent the two states, respectively, of the flip-flop 520, and S526 and R528 which represent the set 526 and reset 528 terminals of the flip-flop 520, has the Q state terminal 522 thereof connected as one input to the two input AND-gate 506 whose other input is connected to a conventional clock source 530 and the $\overline{Q}$ state terminal 524 thereof connected in parallel to the reset terminals 492 and 498 of the counters 486 and 488 and to one input of a three input logic gate, which is preferably an OR-gate 531 whose output is in turn connected to the input terminal 466 of the function control logic network 438. The reset terminal 528 of the flip-flop 520 is connected to the output of a conventional two input AND-gate 532 whose inputs are connected respectively to output terminal 502 and in parallel to output terminal 504 of the counter 488 and an input of NAND-gate 510. The set terminal 526 of the flip-flop 520 is connected in parallel to the data input terminal 518 of the shift register 512 and the output of a conventional audio data demodulator 534. Demodulator 534 has an input terminal 536 connected to multifunction system control input terminal 14. The demodulator 534 is conventional and a detailed description thereof is unnecessary.

Input register 478, whose internal circuitry, as was previously mentioned, is identical with that of input register 480, and in which identical components are identified by the same reference numeral as utilized in the description of input register 478 followed by a subscript "*a*," has the $\overline{Q}$ terminal 524*a* of flip-flop 520*a* connected in parallel to OR-gate 531 and input terminal 448 of the function control logic network 438. The shift register 512*a* eight bit parallel output terminal 514*a* is connected in parallel to output registers 482 and 484, in a manner to be described in greater detail hereinafter, and to input terminal 444 of the function control logic network 438; and the shift register 512*a* clear input terminal 516*a* is connected in parallel to output terminal 462 of the function control logic network 438.

An additional conventional demodulator 538, has an input terminal 540 connected to input terminal 24 of the multifunction system control 12, and output terminals 542 and 544, with output terminal 542 connected in parallel to the set input terminal 526*a* of the flip-flop 520*a* and the data input terminal 518*a* of the shift register 512*a* to, preferably, provide an eight bit serial input to the shift register 512*a*.

The output terminal 544 of the demodulator 538 is connected to a control latch network 546, which is shown in greater detail in FIG. 5, and whose internal circuitry will be described in greater detail hereinafter, having an input terminal 548 to which input terminal 544 of demodulator 538 is connected, another input terminal 550 which is connected to output terminal 468 of the function control logic network 438, and a plurality of output terminals illustratively shown as comprising seven such terminals including six output terminals 36, 40, 42, 38, 28 and 26 of the multifunction system control 12, and an additional output terminal 552, to provide an output therefrom. Control latch network output terminal 552 is connected to input terminal 456 of the function control logic network 438 to provide an input thereto.

Now describing output register 482 in greater detail, output register 484, preferably, being identical therewith, register 482 includes a pair of conventional four bit counters 566 and 568. Counter 566 has an input terminal 570, a reset terminal 572 and an output terminal 574; and counter 568 has an input terminal 576, a reset terminal 578 and a plurality of output terminals, illustratively shown as comprising three such terminals 580, 582 and 584. Reset terminals 572 and 578 of the counters 566 and 568 are coupled together to receive a reset signal simultaneously. A three input AND-gate 586 has its output connected to input terminal 570 of counter 566 and one input thereto connected to a conventional clock pulse input source 588 for interrogating or enabling AND-gate 586. The output terminal 574 of the counter 566 is connected in parallel to the input 576 of the counter 568 and to a conventional ten bit Parallel In Serial Out shift register 590, having a clock input terminal 592 to which the output terminal 574 is connected, a load input terminal 594 which is connected to output terminal 464 of the function control logic network 438 and, through a conventional logic inverter 595, to an input to AND-gate 586 and to a conventional flip-flop device 596, an eight bit parallel input terminal represented illustratively by one terminal 597, connected in parallel to input register output terminals 514 and 514*a* to receive the outputs thereof, input terminals 598 and 600 which are connected to a source of positive potential (not shown) equivalent to logic 1, an input terminal 602 which is connected to reference potential, or ground, and a serial output terminal 604 which is connected to output terminal 30 of the multifunction system control 12 and, therefrom to hard copy device 200 for providing data thereto.

The flip-flop device 596 to which the output of inverter 595 is connected in parallel, is a conventional bistable flip-flop 596, illustratively shown as having four terminals, a Q state terminal 606 which is connected to another input to AND-gate 586, a $\overline{Q}$ state terminal 608 which is connected in parallel to counter reset terminals 572 and 578 and input terminal 442 of the function control logic network 438, a set terminal 610 to which the inverter 595 output is connected, and a reset terminal 612. The reset terminal 612 of the flip-flop 596 is connected to the output of a three input NAND-gate 614 whose inputs are connected to the output terminals 580, 582 and 584 of the counter 568.

Output register 484 which, as was previously mentioned, is, preferably, structurally identical with output register 482, and whose identical components will be given the same reference numeral is utilized in the above detailed description of output register 482 followed by a subscript "*a*," has the load input terminal 594*a* and inverter 595*a* connected in parallel to output terminal 466 of function control logic network 438. The $\overline{Q}$ output terminal 608*a* of flip-flop 596*a* is connected in parallel to reset terminals 572*a* and 578*a* of counters 566*a* and 568*a* and to input terminal 458 of function control logic network 438. The serial output terminal 604*a* of shift register 590*a* is, preferably, connected to the input terminal of a conventional modulator-demodulator, or modem 616, which will not be described in greater detail hereinafter and which is utilized in conjunction with conventional telephone lines (not shown) for transmission of data from the routing network 10 of the present invention, in a manner to be described in greater detail hereinafter; the output of modem 616 being connected to output terminal 34 of the multifunction system control 12. If desired, modem 616 and demodulator 538 could be replaced by a single modem for use in conjunction with a bidirectional transmission path. The parallel input terminal 597*a* of the shift register 590*a* is connected in parallel to the parallel input terminal 597 of shift register 590 and to a conventional eight bit latch keyboard input buffer 618.

The input buffer or register 618 has an input terminal 620 which is connected to input terminal 22 of the multifunction system control 12 and therefrom to the output 194 of keyboard device 192, a clear input terminal 622 which is connected in parallel with the input shift register clear input terminals 516 and 516*a* to output terminal 462 of the function control logic network 438, and a pair of output terminals 624 and 626, 626 being multibit, with terminal 624 connected to OR-gate 531, and terminal 626 connected in parallel with input register parallel output terminals 514 and 514a and output register parallel input terminals 597 and 597a and a data input terminal 628 of a conventional memory 630.

The conventional memory 630, has a capability of storing a plurality of eight bit words, for example, 2,048 such words, and preferably has a plurality of storage addresses which are dependent on position and line in the memory 630. The memory 630 has a plurality of inputs, illustratively being shown as comprising four such input terminals 628, 632, 634 and load input terminal 636, inclusive of terminal 628, and an output terminal 638 which is connected to output terminal 32 of the multifunction system control 12, and therefrom to input terminal 82 of the video data generator 72. Memory load terminal 636 is connected to output terminal 460 of the function control logic network 438 for control thereby, in a manner to be described in greater detail hereinafter. Input terminal 632 of the memory 630, which is the line address input, is connected to the output of a two input OR-gate 640.

The OR-gate 640 has one input connected to input terminal 16 of multifunction system control 12 and the other input connected to the output of a conventional line address five bit up/down counter 642, for a purpose to be described in greater detail hereinafter. The input to the line address five bit up/down counter 642 is connected to output terminal 474 of the function control logic network 438 for control thereby in a manner to be described in greater detail hereinafter. Input terminal 634 of the memory 630, which is the position address input, is connected to the output of a two input OR-gate 644. One input of the OR-gate 644 is connected to input terminal 18 of the multifunction system control 12 and the other input to the OR-gate 644 is connected to the output of a conventional position address six bit up/down counter 646 whose input is connected to the output terminal 472 of the function control logic network 438 for control thereby in a manner to be described in greater detail hereinafter.

As shown and preferred, a conventional multistable counter 648, which preferably has two bits having four states 0–0 1–0, 0–1, and 1–1, associated therewith for a purpose to be described in greater detail hereinafter, has two output terminals 650 and 652 connected to input terminals 452 and 454, respectively, of the function control logic network 438 to provide supervisory control therefor in a manner to be described in greater detail hereinafter, and an input terminal 654 connected to the output 656 of a conventional monostable pulse stretcher 658 for changing the state of the counter 648 for a purpose to be described in greater detail hereinafter. The input to the monostable pulse stretcher 658 is connected to the output terminal 470 of the function control logic network 438 to be actuated thereby in a manner to be described in greater detail hereinafter.

Function Control Logic Network

Now referring to FIG. 5, and describing the function control logic network 438 in greater detail, the function control network 438 includes a plurality of condition responsive logic gates illustratively shown as comprising seventeen such gates, 660, 662, 664, 668, 670, 672, 674, 676, 678, 680, 682, 684, 686, 688, 690, 692 and 694. Input terminal 440 of the function control logic network 438 is connected in parallel to gates 670, 674, 676, 678, 680, 682 and 684 which, as shown and preferred are AND gates, so as to provide a common clock pulse input thereto for interrogating, or enabling these gates. AND-gate 674, which has three inputs, has a second input connected in parallel to input terminals 452 and 454, in addition to the first input connection to input terminal 440, so as to provide an output condition to terminal 462 responsive to the input conditions in a manner to be described in greater detail hereinafter. AND-gate 676, which has two inputs, has the other input thereto connected in parallel to the output of gate 672 which is, preferably, a three input OR gate, so as to provide an output condition to terminal 470 responsive to the input conditions. OR-gate 672 has one input connected in parallel to terminal 452; the second input connected in parallel to the output of gate 660, which is, preferably, a five input AND gate; and the third input connected in parallel to the output of gate 668, which is, preferably a three input AND gate.

AND-gate 660 has one input connected in parallel to terminal 452 through a conventional logic inverter 696, whose output is also connected in parallel to one input of three input AND-gate 668, the other two inputs of AND-gate 668 being connected to input terminal 450, and in parallel to input terminal 454 so as to provide an output responsive to the input conditions as an input to OR-gate 672 and in parallel as an input to AND-gate 682, which has three inputs, the other two inputs of AND-gate 682 being connected to the clock input 440 and the output of gate 664. Gate 664 is, preferably, a two input OR gate so as to provide an output condition to terminal 460 responsive to the input conditions. The second input of AND-gate 660 is connected to terminal 454 through another conventional logic inverter 698. The output of inverter 698 is also connected as one input to gate 662 which is, preferably, a two input AND gate, the other input to AND-gate 662 being connected to terminal 452. The other three inputs to AND-gate 660 are connected to input terminals 442, 446 and 458, respectively, which are connected to output register 482, input registers 478 and 480 in parallel with input buffer 618, and output register 484, respectively so as to provide an output response to the input conditions. The output of AND-gate 662 is connected in parallel to an input to AND-gate 684, which has three inputs, and to an input to AND-gate 670, which also has three inputs. AND-gate 678, which has three inputs, has the second input connected in parallel to the output of AND-gate 660, the first input being connected to clock terminal 440. The third input to AND-gate 678 is connected to terminal 448 through another conventional logic inverter 700 to provide a condition responsive output to terminal 466.

AND-gate 680, which has three inputs including the input connected to clock terminal 440, has the second input connected in parallel to the output of AND-gate 660, and the third input connected to terminal 456, so as to provide a condition responsive output to terminal 464.

The two inputs of OR-gate 664 are connected respectively to input terminals 444a and 444b which represent two of the eight parallel bits present at input terminal 444, preferably the sixth and seventh bits. This will provide the condition responsive output to terminal 460, the output of OR-gate 664 being connected in parallel through a conventional logic inverter 702 to an input of AND-gate 670.

As was previously mentioned, the output of AND-gate 662 is connected to an input of AND-gate 670 as is clock terminal 440 so as to provide an output responsive to the input conditions. The output of AND-gate 670 is preferably connected to a conventional five bit decoder matrix 704, which will not be described in greater detail hereinafter. Suffice it to say, decoder matrix 704 has five data inputs 706, 708, 710, 712 and 714 which are each connected, respectively, to input terminals 444c, 444d, 444e, 444f and 444g, which preferably represent the first, second, third, fourth and fifth bits, respectively, of the eight parallel bits present at input terminal 444; and a clock input terminal 716 which is connected to the output of AND-gate 670 so as to be enabled thereby. The decoder matrix 704 has a plurality of outputs, illustratively shown as comprising 22 such output terminals 718, 720, 722, 724, 726, 728, 730, 732; and a plurality of output terminals 468a, 468b, 468c, 468d, 468e, 468f, 468g, 468h, 468i, 468j, 468k, 468l, 468m, and 468n, all represented by output terminal 468 in FIG. 2. The conventional five bit decoder matrix 704 provides an output signal to one of the output terminals dependent on the digital configuration of the input data. Output terminal 718 is connected to an input of gate 686 which is, preferably, a two input OR-gate 686 whose other input is connected to the output of AND-gate 684 to provide a condition responsive output to terminal 472a, represented by terminal 472 in FIG. 2. Output terminals 720 and 722 are connected to two inputs of gate 688, which is, preferably a two input OR gate, whose output is connected to terminal 472*b*, which is represented by terminal 472 in FIG. 2. Output terminal 724 is connected to an input of gate 690, which is, preferably a two input OR gate, as is output terminal 732 which is connected in parallel to the other input of OR-gate 690 and to output terminal 474*c*, so as to provide a condition responsive output from OR-gate 690 to terminal 472*c*, which is represented in FIG. 2 by terminal 472, and a condition responsive output to terminal 474*c*, dependent on the input conditions. Output terminals 726 and 728 are connected to two inputs of gate 692, which is, preferably, a two input OR gate, whose output is connected to terminal 474*a*, which is represented in FIG. 2 by terminal 474, so as to provide a condition responsive output thereto dependent on the input conditions. Output terminal 730 is connected to terminal 474*b*, which is also represented in FIG. 2 by output terminal 474, so as to provide a condition responsive output thereto.

Output terminals 468*f* and 468*g* are, respectively, connected to two inputs to gate 694, which is, preferably, a two input OR gate, so as to provide a condition responsive output, and directly to the control latch network 546 in a manner to be described in greater detail hereinafter. The output of OR-gate 694 is also connected to the control latch network 546 as are the remaining output terminals 468*a*, 468*b*, 468*c*, 468*d*, 468*e*, 468*h*, 468*i*, 468*j*, 468*k*, 468*l*, 468*m* and 468*n*, all being represented by terminal 468 in FIG. 2.

Now describing the control latch network 546, in greater detail, the control latch network 546, preferably, includes a plurality of monostable multivibrators, illustratively shown as comprising five such conventional monostable multivibrators 734, 736, 738, 740 and 742; and a plurality of conventional bistable flip-flops, illustratively shown as comprising seven such flip-flop devices 744, 746, 748, 750, 752, 754 and 756. Terminals 468*a*, 468*b*, 468*c*, 468*d*, and 468*e* are connected, respectively, to an input 758, 760, 762, 764 and 766 of monostable multivibrators 734, 736, 738, 740, and 742, respectively, whose outputs are connected to terminals 36*a*, 36*b*, 36*c*, 36*d* and 36*e* which are all represented by output terminal 36 of the multifunction system control 12 in FIG. 2.

Flip-flop devices 744, 746, 748 and 750 each have set "S" and reset "R" terminals 768 and 770, 772 and 774, 776 and 778, and 780 and 782, respectively, and output terminals 784, 786, 788 and 790. Set terminal 768 of flip-flop 744 is connected to terminal 468*f*; and reset terminal 770 of flip-flop 744 is connected to terminal 468*g*, with the output 784 of the flip-flop 744 being connected to output terminal 40 of the multifunction system control 12. Reset terminal 774 and set terminal 772 of flip-flop device 746 are connected, respectively, to the output of OR-gate 694 and to terminal 468*h*, with the output 786 thereof being connected to output terminal 38 of the multifunction system control 12. Set terminal 776 and reset terminal 778 of flip-flop 748 are connected, respectively, to terminal 468*i* and terminal 548, which is in turn connected to terminal 544 of demodulator 538, with the output 788 thereof connected to output terminal 42 of the multifunction system control 12. Each of the flip-flop devices 752, 754 and 756 have both data and clock input terminals 792 and 794, 796 and 798, and 800 and 802, respectively, and output terminals 804, 806 and 808, respectively. The set 780 and reset 782 terminals of flip-flop 750 are, respectively, connected to terminals 468*j* and 468*k*, with the output terminal 790 thereof being connected in parallel to the data input terminals 792, 796 and 800 of flip-flops 752, 754 and 756, respectively. The clock input terminals 794, 798 and 802 of flip-flop devices 752, 754 and 756, respectively, are connected to terminals 468*l*, 468*m* and 468*n*, respectively, which terminals 468*l*, 468*m* and 468*n* are selectively connected to the decoder clock input terminal 716 to receive and route the clock pulse to the proper flip-flop 752, 754, or 756 in accordance with the particular five bit parallel code which is input to the decoder 704 at terminals 444*c*, *d*, *e*, *f* and *g*. The output terminals 804, 806 and 808 of flip-flops 752, 754 and 756 are connected, to terminal 552, output terminal 28 of multifunction system control 12, and output terminal 26 of multifunction system control 12, respectively. Output terminal 552 is connected in turn to input terminal 456 of the logic network 438 (FIG. 2).

OPERATION

Logic Network Operation

For ease in understanding the operation of the multifunction routing network 10 of the present invention, the operation of the function control condition responsive logic network 438 will be described. This description will be made with reference to FIG. 2, FIG. 5 and FIG. 7, the latter being a condition responsive logic flow diagram. Thereafter, the operation of the various other portions of the network 10 as the function control logic network 438 (FIGS. 2 and 5) coordinates the various circuit 10 operations will also be described.

Figure 7:
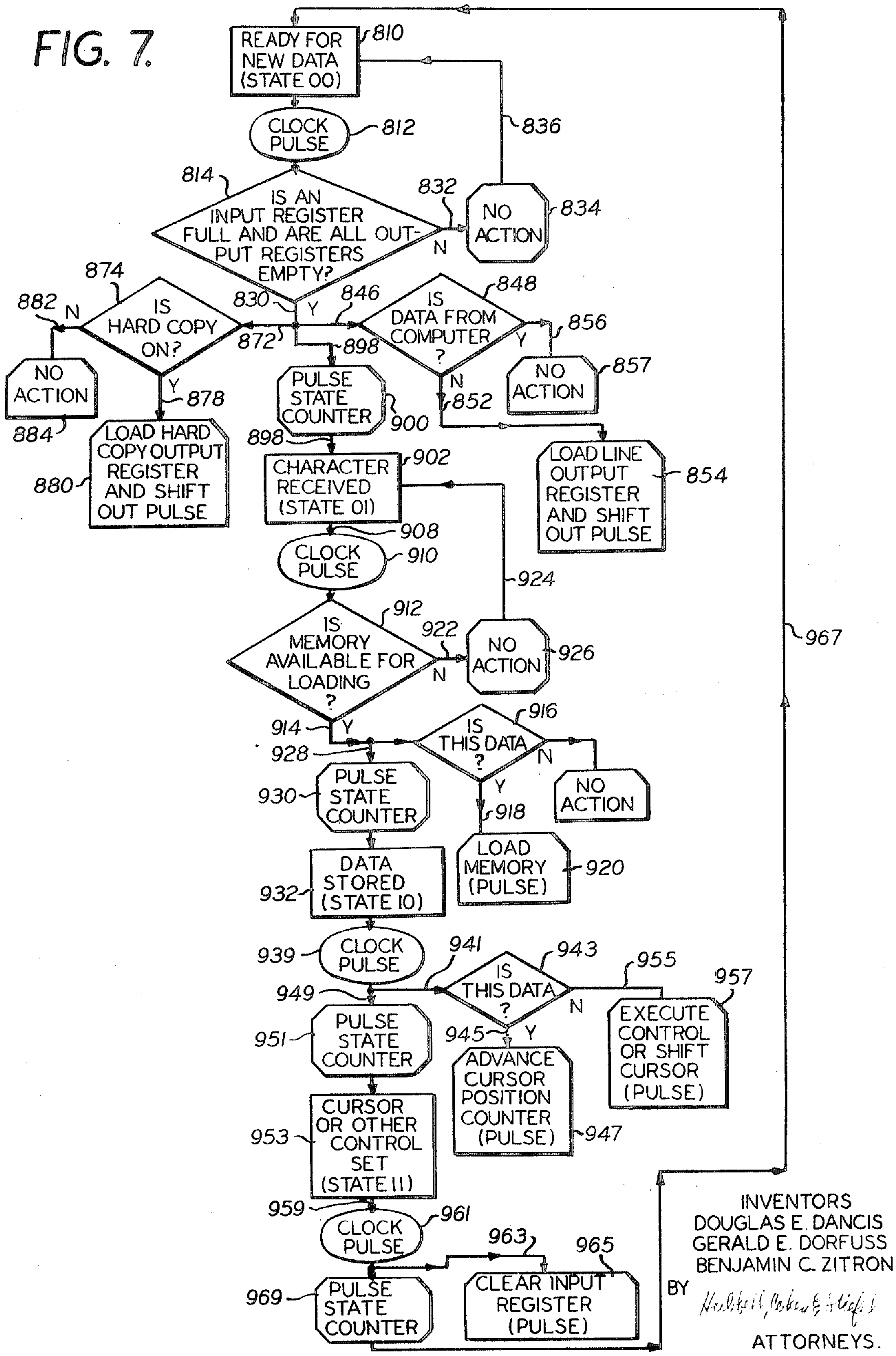
FIG. 7 is a logic flow diagram for the function control logic portion of the network shown in FIG. 5.

For purposes of illustration, it will be assumed that the two-bit multistable counter 648 (FIG. 2), which is the master, or supervisory counter which controls the state of the function control logic network 438, in a manner to be described in greater detail hereinafter, is in its initial state which for purposes of illustration is termed state 0—0. This state is represented by the process symbol 810 labeled "READY FOR NEW DATA" (FIG. 7). In this condition there is a logic O present at terminals 452 and 454 (FIGS. 2 and 5). The data that is received by the function control logic network 438, which is now in a position to receive such data, may be either data signals, which are signals containing data information, or nondata execute control signals, which are signals containing merely control information rather than data information. When a clock pulse is supplied to terminal 440 (FIGS. 2 and 5) which is represented by block 812 (FIG. 7), the AND-gates 670, 674, 676, 678, 680, 682 and 684 (FIG. 5) are interrogated and the output condition resulting therefrom, is responsive to the input conditions resulting from whether the output registers 482 and 484 (FIG. 2) are empty while an input register 478, 480 or 618 (FIG. 2) is full. This condition is represented by decision symbol 814 (FIG. 7).

This information is supplied from output register 484, which is termed the Line Output Register, $\overline{Q}$ state output terminal 608*a* of flip-flop 596*a* via path 816 (FIGS. 2 and 5) as an input to AND-gate 660; from output register 482, which is termed the Hard Copy Output Register when a hard copy device 200 is utilized in the routing network 10, from the $\overline{Q}$ state terminal 608 of flip-flop 596 via path 818 (FIGS. 2 and 5) to another input to AND-gate 660; and a signal from input registers 478, termed the Audio-Visual Playback Input Register, and input register 480, termed the Line Input Register, from the $\overline{Q}$ state terminal 524 of flip-flop 520, or 524*a* of flip-flop 520*a*, or the eight bit latch keyboard input buffer output terminal 624, through OR-gate 531 via output path 820 (FIGS. 2 and 5) to supply another input to AND-gate 660 (FIG. 2). AND-gate 660 receives the outputs of the multistable counter 648 through logic inverters 696 and 698, respectively.

The signal present on path 816 (FIGS. 2 and 5) represents the Line Output Register empty or full condition, the signal present on path 818 (FIGS. 2 and 5) represents the Hard Copy Register empty or full condition, the signal present on path 820 (FIGS. 2 and 5) represents the input registers full or empty condition, and the signals through logic inverters 696 and 698 (FIG. 5) represent the state of the multistable counter 648. The state of the multistable counter 648 is also fed in parallel via paths 822 and 824 (FIGS. 2 and 5) as inputs to AND-gate 674 to provide an output data control signal, or pulse, via parallel path 826 (FIGS. 2 and 5) to the input buffer 618, the clear input terminal 516 of shift register 512, and the clear input terminal 516*a* of shift register 512*a* of input registers 478 and 480 (FIG. 2), respectively, when the one-one (1-1) state exists on paths 822 and 824 and the input conditions defined by decision symbol 814 (FIG. 7) are met.

AND-gate 660 (FIG. 5) provides an output signal, or pulse on parallel path 828 when the 0-0 state is present on paths 822 and 824 (the 9-9 state signal present on paths 822 and 824, going through a logic inversion in inverters 696 and 698 to present a 1-1 input to AND-gate 660) when the conditions enumerated in symbol 814 (FIG. 7) are all present on paths 816, 818, and 820 (FIGS. 2 and 5), respectively. This output condition is represented by the YES decision path 830 from decision symbol 814 (FIG. 7), the absence of any of these input conditions for the 0—0 state of counter 648 (FIG. 2) resulting in no output pulse from AND-gate 660 (FIG. 5) and being represented by the NO decision path 832 (FIG. 7) from decision symbol 814. A NO decision, results in no further action occurring in routing network 10, which condition is represented by symbol 834 (FIG. 7), which provides an iterative loop via path 836 (FIG. 7) back to the READY FOR NEW DATA 0—0 state condition of the multistable counter 648 (FIG. 2) which looping, preferably, continues until all the input conditions to AND-gate 660 (FIG. 5) are met to provide an output signal, or pulse on parallel path 828 (FIG. 5). Parallel path 828 provides an input to OR-gate 672 (FIG. 5), an input to AND-gate 678 (FIG. 5) and an input to AND-gate 680.

The clock pulse from clock 476 (FIG. 2) via parallel path 838 (FIGS. 2 and 5) provides the enabling input to gate 678. The third input to AND-gate 678 is a computer data input via path 840 (FIGS. 2 and 5) which is also from the Q state terminal 524*a* of flip-flop 520*a* of Line Input Register 480 which signal is present when a computer output is provided on path 842 (FIGS. 1 and 2) which in turn is an eight bit serial input which is provided from demodulator 538 via path 844 (FIG. 2) to input terminal 518*a* of shift register 512*a* and to the set terminal 526*a* of the flip-flop 520*a* of the Line Input Register 480.

The output condition of AND-gate 678 is represented by branch path 846 in FIG. 7 and decision symbol 848 labeled "IS DATA FROM COMPUTER" (FIG. 7). If a signal is present on path 840 through logic inverter 700 (FIG. 5) to AND-gate 678, an output pulse is present on path 828, and a clock pulse is present on path 838, an output is provided from AND-gate 678 via path 850 (FIGS. 2 and 5) to the load input terminal 594*a* of shift register 590*a*, to load the output register 484 (FIG. 2), and in parallel through logic inverter 595*a* to an input to AND-gate 586*a* and to the set input terminal 610*a* of flip-flop 596*a* of Line Output Register 484. This condition is represented by the NO decision path 852 from decision symbol 846 which terminates in process symbol 854 labeled "LOAD LINE OUTPUT REGISTER AND SHIFT OUT PULSE" (FIG. 7). When the data is from the computer, which is represented by YES decision path 856 (FIG. 7), no further action, represented by symbol 857 (FIG. 7), is taken by the function control logic network 438 (FIGS. 2 and 5).

In addition to the clock input via path 838 to AND-gate 680 (FIG. 5), and the AND-gate 660 output pulse via path 828 to AND-gate 680 (FIG. 5), a Transmit Hard Copy signal via path 858 (FIGS. 2 and 5), which is the output path for control latch network 546 flip-flop 752 output 804 when a particular five bit code is transmitted on parallel paths 860, 862, 864, 866 and 868 (FIG. 5) from representative parallel path 870 from output terminal 514 of shift register 512 of input register 478 (FIG. 2), output terminal 514*a* of shift register 512*a* of Line Input Register 480 (FIG. 2), or output terminal 626 of the input buffer 618 (FIG. 2), to be described in greater detail hereinafter. This input condition is represented by branch path 872 of FIG. 7 and decision symbol 874 labeled "IS HARD COPY ON?"

When all conditions to AND-gate 680 (FIG. 5) exist, that is, when signals are present on paths 828, 838 and 858, an output pulse is provided by AND-gate 680 via path 876 (FIG. 2 and 5) to the load input terminal 594 (FIG. 2) of the shift register 590 of the Hard Copy Output Register 482 to load the output register 482. This output condition is represented by the YES decision path 878 terminating in the process symbol 880 labeled "LOAD HARD COPY REGISTER AND SHIFT OUT PULSE" (FIG. 7). If any input condition is absent, that is, if no signal is present on any one of the signal paths 828, 838 or 858 (FIG. 5), then no action is taken. This output condition is represented by the NO decision path 882 of FIG. 7, terminating in the symbol 884 labeled "NO ACTION" (FIG. 7).

To provide a nondata change state execute control signal output condition, OR-gate 672 (FIG. 5), in addition to the input provided via path 828, is provided with one bit of the state of counter 648 (FIG. 2) via path 822 as another input, and the output of AND-gate 668 via path 886 (FIG. 5), to provide an output pulse via path 888 (FIG. 5) to AND-gate 676 when a signal is present on any one of the paths 822, 828, or 886. AND-gate 668 is provided with one bit of the two-bit state of the counter 648 (FIG. 2) via path 824 and the logic inversion of the other bit of the two-bit state of the counter 648 via path 890 (FIG. 5), and is also provided with a signal from the video data generator 72 OR-gate 396 via output terminal 78 and path 892 (FIGS. 1, 2 and 5), termed the Memory Lock Out Signal. When a signal is present on all three paths 892, 824, and 822 through inverter 696 to AND-gate 668 via path 890 (FIG. 5), an output pulse is provided from AND-gate 668 via parallel paths 886 to OR-gate 672 and AND-gate 682. In the absence of any one signal on paths 892, 824 or 890 (FIG. 5), no output pulse is provided from AND-gate 668, this being the condition in the 0—0 state. When a signal is present on either path 822, 828, or 886 (FIG. 5) an output pulse is provided from OR-gate 672 via path 888, as was previously mentioned, to AND-gate 676 which, along with the presence of a signal on path 838 provides the change state nondata execute control output pulse, or condition, via path 894 to monostable stretcher 658 (FIGS. 2 and 5). In the 0—0 state, path 828 is the only significant path. Monostable stretcher 658 (FIG. 2) in turn provides a change state pulse via path 896 to multistable counter 648 to change its state from 0-0 to 0-1. This nondata change state execute control output condition is represented by branch path 898 and process symbol 900 labeled "PULSE STATE COUNTER," and process symbol 902 labeled "CHARACTER RECEIVED (STATE 0-1)" of FIG. 7.

In the 0-1 state of the multistable counter 648 (FIG. 2), an output pulse via path 886 (FIG. 5) from AND-gate 668 is provided as an output to AND-gate 682 in addition to the clock pulse via path 838 and an additional input condition via parallel path 904 from the output of OR-gate 664 when either the proper sixth or seventh bit of the eight bit parallel output is present on representative path 870 (FIG. 5). The sixth and seventh bits on path 870 are chosen so as to indicate a date transmission input condition to AND-gate 682 via path 904 when either bit is present. When a signal is present on path 886, 838 and 904 (FIG. 5), a data control output condition, or pulse is provided from AND-gate 682 via path 906 (FIGS. 2 and 5) to the load input terminal 636 of memory 630, to load the memory 630 (FIG. 2). This data control output condition is represented by path 908 of FIG. 7, which include another clock pulse symbol 910, a decision symbol 912 labeled "IS MEMORY AVAILABLE FOR LOADING" as well as the YES decision branch path 914 including the decision symbol 916 labeled "IS THIS DATA?" and another YES decision branch path 918 terminating in a process symbol 920 labeled "LOAD MEMORY PULSE," for a signal that is present on path 904, 886, and 838 (FIG. 5) producing a data output condition, or pulse on path 906; and a NO decision branch path 922 (FIG. 7) terminating in no further action by the control logic network 438 (FIGS. 2 and 5) and providing no output pulse on path 906 (FIGS. 2 and 5) when a signal is not present on either paths 904, 886 or 838 (FIG. 5). An iterative NO decision branch loop 924 (FIG. 7) occurs when no signal is present on path 886 (FIG. 5) and no action, represented by the symbol 926 labeled "NO ACTION" (FIG. 7) is taken. However, the branch 924 continues looping until a signal is present on path 886 due to the memory 630 (FIG. 2) being available for loading at which time the condition enumerated in decision symbol 912 is met at which time the YES decision path 914 is followed.

As was previously mentioned, when a signal is present on path 886, an input signal is provided to OR-gate 672 which, in turn, provides an output pulse via path 888 to AND-gate 676 which, in conjunction with the clock pulse 910 (FIG. 7) present on path 838 (FIG. 5) provides a nondata change state execute control output condition, or pulse, via path 894 (FIGS. 2 and 5), to the monostable stretcher 658 (FIG. 2) which, in turn, provides a change state output pulse, via path 896 (FIG. 2), to the multistable counter 648 (FIG. 2) to change its state. In this instance, the state of counter 648 this is changed from the 0–1 state to the 1–0 state. This is represented by branch path 928 of FIG. 7 which includes a process symbol 930 labeled "PULSE STATE COUNTER" and another process symbol 932 labeled "DATA STORED (STATE 1–0)."

For controlling the operation of the five bit decoder 704 (FIG. 5), AND-gate 670 receives a clock input pulse via path 838, a logic inversion of the output pulse from OR-gate 664 via path 934 which includes the logic inverter 702 and an output pulse from AND-gate 662 via path 936 to provide an enable output pulse to the decoder enable input terminal 716 via path 938, in the 1–0 state of counter 648, when a signal is present on all three paths 934, 838, and 936, so as to enable the operation of the five bit decoder 704 (FIG. 5). The clock pulse on path 838 is represented by clock pulse symbol 939 (FIG. 7). This clock pulse 939 together with the presence of a signal on path 888 from OR-gate 672 due to the 1 state signal present on path 822 from the 1–0 state of counter 648, provides the change state nondata execute control output condition, or pulse via path 894, to monostable stretcher 658 (FIGS. 2 and 5). Monostable stretcher 658 (FIG. 2) provides a change state pulse via path 896 to counter 648 to change its state from 1–0 to 1–1. This nondata change state execute control output condition is represented in FIG. 7 by branch path 949, process symbol 951 labeled "PULSE STATE COUNTER," and process symbol 953 labeled "CURSOR OR OTHER CONTROL SET (STATE 1–1)." When parallel paths 860, 862, 864, 866 and 868 contain bits of data, the five bit decoder 704 decodes this data to select a particular position address path 940, 942, or 944 and provide an output pulse thereon, paths 940, 942, and 944 (FIG. 5) being represented by a single position address path 946 in FIG. 2, to change the position address counter 646 (FIG. 2).

AND-gate 684 (FIG. 5) receives input conditions via paths 838, 904 and 936 to provide an output pulse via path 948 to OR-gate 686 when all conditions, or signals are present on paths 838, 904 and 939 (FIG. 5).

OR-gate 686 (FIG. 5) provides an output pulse on path 940 (946) (FIGS. 2 and 5) to position address counter 646 (FIG. 2) which is a position counter up count clock pulse to advance position counter 646. When a pulse is present on either path 950 or 952 (FIGS. 2 and 5) to OR-gate 682 an output pulse is provided on path 942 (FIGS. 2 and 5), which is a position counter down count clock pulse, to position counter 646 to change the position of counter 646 to a new position. When an output pulse is provided on either path 954 (FIG. 5) or on parallel path 956 (FIGS. 2 and 5) to OR-gate 690, a date control output pulse is provided on path 944 (FIGS. 2 and 5) to position counter 646 (FIG. 2) which pulse is a position counter reset clock pulse to reset counter 646.

The five bit decoder 704 (FIG. 5) also provides a line address counter 642 data control output condition, or pulse, from the parallel input bits on paths 860, 862, 864, 866 and 868 via paths 956, 958 and 960 (FIG. 5) which is represented by a single path 961 in FIG. 2, to provide a line address data control output pulse to the line address counter 642 (FIG. 2). When an output pulse is present on either path 962 or path 964 to OR-gate 692 (FIG. 5) a data control output pulse is provided on path 958 to line address counter 642 (FIG. 2) which pulse is a line counter up count clock pulse, to advance line counter 642. When a signal is present on path 960 (FIGS. 2 and 5) a line counter down count clock data control output pulse is provided to line counter 642 to change its position. Furthermore, wen a signal is present on parallel path 956 (FIGS. 2 and 5), a line counter reset clock data control output pulse is provided to the line counter 642 to reset the line counter 642, in addition to the position counter reset clock pulse on path 944 resulting therefrom. The presence of a data responsive condition results in an output signal through gates 686 and 684 to terminal 472*a*. This data responsive condition is represented in FIG. 7 by branch path 941 including a decision symbol 943 labeled "IS THIS DATA?" and YES decision path 945 terminating in process symbol 947 labeled "ADVANCE CURSOR POSITION COUNTER (PULSE)," while the nondata execute control responsive conditions of the five bit decoder 704 are represented in FIG. 7 by NO decision path 955 terminating in process symbol 957 labeled "EXECUTE CONTROL OR SHIFT CURSOR (PULSE)."

Control Latch Network Operation

When the five bit parallel code on paths 860, 862, 864, 866 and 868 (FIG. 5) to the five bit decoder 704, in conjunction with the enable input on path 938, provides a nondata execute control signal instead of a data signal to the decoder 704, then a nondata execute control signal output condition, or signal is provided along output path 966, 968, 970, 972, 974, parallel path 976, parallel path 978, path 980 when a signal is present on either path 976 or 978, 982, 984, 986, 988, 990, 992 or 994, depending on the particular five bit code on input paths 860, 862, 864, 866 or 868. This is also represented in FIG. 7 by the NO decision branch path 955 terminating in process symbol 957 labeled "EXECUTE CONTROL OR SHIFT CURSOR (PULSE)." The occurrence of an execute control output signal or pulse on path 966 causes monostable multivibrator 734 (FIG. 5) to emit a RUN control pulse on parallel path 996*a*, which is represented by a single path 996 in FIGS. 1 and 2, to the motor control circuitry (not shown) of the audiovisual video tape playback device 44 (FIG. 1) which thereby advances and plays back the video tape. The occurrence of an execute control output signal, or pulse on path 968 causes monostable multivibrator 736 (FIG. 5) to emit a Stop control pulse on parallel path 996*b*, represented by path 996 in FIGS. 1 and 2, to the motor control circuitry of playback device 44 which thereby stops. The occurrence of an execute control output signal or pulse on path 970 causes monostable multivibrator 738 (FIG. 5) to emit a FAST FORWARD control pulse on parallel path 996*c*, represented by path 996 in FIGS. 1 and 2, to the motor control circuitry of playback device 44 which thereby advances the video tape in the fast forward mode. The occurrence of an execute control output signal, or pulse on path 972 causes monostable multivibrator 740 (FIG. 5) to emit a FAST REWIND control pulse on parallel path 996*d*, which is represented by path 996 in FIGS. 1 and 2, to the motor control circuitry of playback device 44 which thereby rewinds the video tape. The occurrence of an execute control output signal, or pulse on path 974 causes monostable multivibrator 742 (FIG. 5) to emit a STILL control pulse to the motor control circuitry of playback device 44 which thereby places the device 44 in the STILL mode to continuously playback a segment of the video tape at this point.

The occurrence of a nondata execute control output signal, or pulse on path 976 to the set terminal 768 of flip-flop 744 (FIG. 5) causes flip-flop 744 to provide an execute control signal via parallel path 998 (FIGS. 2 and 5) to the NAND-gates 308 of the switch drivers 202 of the analog video switch 54 and audio switch 63 (FIG. 4), respectively, to cause the switch drivers 202 (FIG. 4) to switch the bias potential from diode bridge 206 to diode bridge 208; as well as via path 980 (FIG. 5) to the reset terminal 774 of flip-flop 746 (FIG. 5) causing flip-flop 746 to provide an execute control signal via path 1200 (FIGS. 1, 2 and 5) to the NAND-gate 308 of switch driver 202 (FIG. 4) of the analog RF switch 176 to cause the switch driver 202 to switch the bias potential from diode bridge 208 to diode bridge 206. In this manner the selection of the output of the analog switches 54, 63 and 176 (FIGS. 1–4) is controlled by switching between input terminals 56 and 58 for the analog video switch 54, between input terminals 64 and 66 for the analog audio switch 63, and between input terminals 178 and 180 for the analog RF switch 176.

The occurrence of a nondata executive control output signal, or pulse on path 978 to the reset terminal of flip-flop 744 (FIG. 5) causes the provision of a signal from flip-flop 744 which is the logic opposite of the signal due to the set condition, which via path 998 (FIGS. 1 and 5) to NAND-gate 308 (FIG. 4) causes the switch drivers 202 of the analog video switch 54 and audio switch 63 to switch the bias potential from bridge 208 to bridge 206. The occurrence of a control pulse on path 978, also causes, via path 980, to the reset terminal 774 of flip-flop 746 (FIG. 5), the provision of an identical control signal to NAND-gate 308, via path 1200, as results from the occurrence of a control pulse on path 976. The occurrence of a nondata execute control pulse on path 982 to the set terminal 772 of flip-flop 746 (FIG. 5) causes the provision of a signal from flip-flop 746 which is the logic opposite of the reset condition which, via path 1200 to NAND-gate 308 (FIGS. 3 and 4), causes the switch driver 202 of the analog RF switch 176 to switch the bias potential from bridge 206 to bridge 208.

The occurrence of a nondata execute control pulse on path 984 to the set terminal 776 of flip-flop 748 (FIG. 5) causes flip-flop 748 to provide an execute control signal via path 1202 (FIGS. 1, 2 and 5) to the NAND-gate 308 of the switch driver 202 (FIGS. 3 and 4) of the analog audio data switch 96 to cause the switch driver 202 to switch the bias potential from bridge 206 to bridge 208 which in effect opens the analog audio data switch 96. A control pulse occurs on path 1204 (FIGS. 2 and 5) from demodulator 538 when audio data is received from the computer 84 at terminal 24 of the multifunction system control 12 (FIG. 1). When this control pulse occurs on path 1204, it is provided to the reset terminal of flip-flop 748 (FIG. 5) which is thereby caused to provide a signal which is the logic opposite of the signal due to the set condition, which, via path 1202 to NAND-gate 308 causes the switch driver 202 of the analog audio data switch 96 to switch the bias potential from bridge 206 to 208 which, in effect, closes switch 96 so as to feed audio data from the computer 84 to input 66 of the analog audio switch 63.

The occurrence of a control pulse via path 986 to the set terminal 780 of flip-flop 750 (FIG. 5) places flip-flop 750 in the Q state to provide a signal via parallel path 1206 to the data (D) terminals 792, 796 and 800 of flip-flops 752, 754 and 756, respectively, to set the flip-flops 752, 754 and 756, which do not provide a control output signal in this state. The occurrence of a control pulse via path 988, to the reset terminal of flip-flop 750 resets the flip-flop 750. The occurrence of a data control output pulse, which is the clock pulse on path 938, via path 990, to the clock (CK) terminal 794 of flip-flop 752 (FIG. 5) causes flip-flop 752 to assume the present state of flip-flop 750. If this state is the set state when flip-flop 752 is set which causes it to provide a Transmit Hard Copy data control output signal in this set state, via path 858 (FIGS. 2 and 5), to AND-gate 680 of the function control logic network 438 (FIG. 2). When a nondata execute control pulse, which is the clock pulse on path 938, is provided, via path 992, to the clock (CK) terminal 798, flip-flop 754 (FIG. 5) assumes the present state of flip-flop 750. If this state is the set state, flip-flop 754 provides an execute control signal, via path 1208 (FIGS. 1, 2 and 5) to external control device 196 to effect an operation thereof, such as turning device 196 (FIG. 1) ON. Similarly, when a nondata execute control pulse, which is the clock pulse on path 938, is provided, via path 994, to the clock (CK) terminal 802 of flip-flop 756, flip-flop 756 (FIG. 5) assumes the present state of flip-flop 750. If this state is the set state, flip-flop 754 provides an execute control signal via path 1210 (FIGS. 1, 2 and 5), to external control device 198 (FIG. 1) to effect an operation thereof, such as turning device 198 ON.

Preferably, after the operation of the five bit decoder 704 of the function control logic network 438 has routed the proper control signal to the proper output terminal thereof in the 1-1 state of multistable counter 648, the occurrence of the next clock pulse from source 476 to AND-gate 674 together with the 1-1 signal conditions on paths 822 and 824, provides a data control output condition, or pulse, termed the Clear Input Register Signal, via path 826, to the clear input terminals 516, 516*a*, and 622 of shift registers 512 and 512*a*, and buffer 618, respectively. This signal empties these devices 512, 512*a*, and 618. This condition is represented in FIG. 7 by path 959 including clock pulse symbol 961, and branch path 963 including decision symbol 965 labeled "CLEAR INPUT REGISTER (PULSE)." The occurrence of this clock pulse 961 (FIG. 7) together with the presence of the 1 state of counter 648 on path 822 to OR-gate 672, which gate 672 provides an output pulse on path 888, also provides the change state nondata execute control output condition, or pulse, via path 894, to monostable stretcher 658 (FIGS. 2 and 5). Monostable stretcher 658 (FIG. 2) provides a change state pulse via path 896 to counter 648 to change its state from 1-1 back to the 0-0 initial condition, thereby completing the multifunction control loop which, preferably continues to repeat again in the same manner as previously described. This iterative control loop may be repeated as many times as desired. This condition is represented in FIG. 7 by return loop path 967 which includes the process symbol 969 labeled "PULSE STATE COUNTER" and the process symbol 810 "READY FOR NEW DATA (STATE (0-0)."

The functioning of control network 438 and control latch network 546 (FIGS. 2 and 5) is, therefore, dependent on the input conditions applied thereto, which, in turn, are dependent on the video and audio data, as well as the control signal data output of the audiovisual tape playback device 44; the various data outputs of the video data generator 72 (FIGS. 1 and 6) which are indicative of horizontal position (76) and vertical line (74), as well as a memory lock out data control signal (78) and an analog video switch input signal (80); an output signal from computer 84, if such a computer is utilized; and an output signal from keyboard input device 192, if such a device is utilized. The function control condition responsive logic network 438 provides output conditions, which are dependent on these input conditions, to the external devices 196 and 198, hard copy device 200 if the printing of hard copy is desired, computer 84, the keyboard input buffer 618, the Line Input Register 480 and Audio-Visual Input Register 478, the Line Output Register 484 and Hard Copy Output Register 482, and analog switches 54, 63, 96 and 176 so as to control the flow of data signals and execute control signals within the routing network 10.

Input Register Operation

Now describing the operation of the input registers 478 and 480, as shown in FIG. 2, in providing input conditions to the function control logic network 438 and in responding to output conditions therefrom. Both input registers 478 and 480 have the same manner of operation. An output pulse is provided by AND-gate 506 to the four bit counter 486, due to the presence of a clock pulse from source 530 and a Q state output 522 from flip-flop 520. The Q state output 522 is due to the start bit, an eight bit serial input from demodulator 534 which is, in turn, due to the presence of data from the audiovisual playback device 44 for input register 478. Similarly, for input register 480, AND-gate 506*a* provides an output pulse to counter 486*a* due to the presence of a clock pulse from source 530*a* and a Q state output 522*a* from flip-flop 520*a*; the Q state output 522*a* being due to the presence of the start bit of an eight bit serial input from computer 84 through demodulator 538. The four bit counters 486 and 486*a* count on the trailing edge of the input signal from AND-gates 506 and 506*a*, respectively, which input signal is a clock signal whose frequency is approximately 16 times the frequency of the input data, to provide an output pulse to both AND-gate 508 and to the input 496 of four bit counter 488, which input 496 is at the frequency of the incoming data, the rising edge of which is approximately at the center of each incoming data bit, for input register 478, and to AND-gate 508a and the input 496a of four bit counter 488a for input register 480. Counters 488 and 488a, which count on the trailing edge of the input thereto, count the number of incoming bits of the data word to provide an output to NAND-gates 510 and 510a, respectively, after the complete eight bit data word has been received. NAND-gate 510 and 510a permit gates 508 and 508a, respectively to provide the clock input pulse synchronized to the data to the shift registers 512 and 512a until the complete data word has been received. Shift registers 512 and 512a shift on the rising edge of the clock input pulse. Eight bit serial data from demodulator 534 is fed to the data input 518 of shift register 512 which, in turn, provides an eight bit parallel output on path 870 from the serial data when the shift register 512 stops shifting. Similarly, for input register 480, eight bit serial data from demodulator 538 is fed to the data input 518a of shift register 512a which, in turn, provides an eight bit parallel output on path 870 from the serial data when the shift register 512a stops shifting. Two of the bits of the four bit output of counters 488 and 488a, respectively, are fed from output terminals 502 and 504, and 502a and 504a, respectively, to NAND-gates 532 and 532a, respectively, to provide a reset pulse to flip-flops 520 and 520a, respectively. Flip-flops 520 and 520a are reset to the $\bar{Q}$ state to provide the $\bar{Q}$ state outputs 524 and 524a to the reset terminals 492 and 498 of counters 486 and 488, and reset terminals 492a and 498a of counters 486a and 488a, respectively, to reset the counters 486, 488, 486a, and 488a, and an input condition on path 820 to logic network 438, which indicates that the input registers are full since data is present in shift registers 512 and 512a due to a clock shift pulse being provided only in the Q state of flip-flops 520 and 520a.

Output Register operation

Both output registers 482 and 483 function in the same manner, and for purposes of illustration, only the operation of register 482, as shown in FIG. 2, in providing input conditions to the function control logic network 438 and in responding to output conditions therefrom will be described. AND-gate 586 is provided with a clock input pulse from clock source 588, a load input pulse from inverter 595, and the Q state output 606 from flip-flop 596 to provide an input pulse to the four bit counter 566. Counter 566 counts on the trailing edge of the input pulse to provide an output pulse to the four bit counter 568 and to the ten bit parallel in-serial out shift register 590, which has been provided with the load input signal from logic network 438. When the load input and clock inputs are present, shift register 590 provides an eight bit serial output signal to the hard copy device 200 for Hard Copy Output Register 482 or an eight bit serial output signal to modem 616 which provides an eight bit serial input signal to the computer 84. The input register eight bit parallel output is also provided to the memory 630 which stores this information in the address determined by the position address up-down counter 646 taken in conjunction with the line address up-down counter 642. The memory 630 storage position is determined from the horizontal position counter 316 and the vertical line counter 320 of the video data generator 72, whose operation will now be described in greater detail hereinafter.

Video Data Generator Operation

Now describing the video data generator 72 as shown in FIG. 6, in providing input conditions to the logic network 438 (FIG. 2) and in responding to output conditions therefrom. The output of memory 630 (FIG. 2) is provided to the input 414 of the Input Address READ ONLY MEMORY 408 via path 694 (FIGS. 1 and 6) to provide a seven bit ASCII character data input; a three bit row address input also being provided to the Input Address READ ONLY MEMORY 408 from the four bit raster row counter 318 to provide a five bit output, which, via path 1220, is fed to the five bit data input 418 of the five bit multiplexer 416. The four bit counter output multiplexer 314 provides a three bit address input, via path 329, to the three bit address input of five bit multiplexer 416, which, in turn, provides a one bit data signal output to NAND-gate 424. NAND-gate 424 receives a blanking signal via parallel path 892 through inverter 426 in addition to the multiplexer 416 output pulse to provide an output pulse to NAND-gate 425, which has the logic 1 input 430 as its other input, to provide an output pulse. The NAND-gate 425 output together with the sync pulse which is present on path 1222, which pulse is the logic inversion of the horizontal sync pulse from the horizontal position counter 316, and/or the logic inversion of the vertical sync pulse from the vertical line counter 320 which pass through logic inverters 402 and 391, respectively, to provide a video output signal to output terminal 80 (FIGS. 1 and 6).

The seven bit horizontal position counter 316 is provided with an input from the two bit responsive output of AND gate 338 associated with the four bit counter output multiplexer 314 and provides a six bit horizontal position data output via path 335 and a one bit horizontal blanking output via path 1224. The one bit horizontal blanking output on path 1224 provides a horizontal blank output to OR-gate 396 resulting in a blanking signal output on path 892, and an input to an AND-gate 398, together with the fourth bit data input on path 1226, and the third bit data input on path 1228 or second bit data input on path 1230, to provide a horizontal sync output on path 1232.

The four bit raster row counter 318 which, as was previously mentioned, provides a three bit row address input to the READ ONLY MEMORY 408, also provides a raster row blanking output, via path 1234, to OR-gate 396 to provide a blanking signal output on path 892. One bit of the three bit raster row output present on path 347 from counter 318 is provided via path 1236 as an input to AND-gate 358 which is also provided with the raster row blanking output on parallel path 1234 to provide an input to the five bit vertical line counter 320 input terminal 354 and the reset terminal 344 of the raster row counter 318 via OR-gate 350. The five bit vertical line counter 320 provides a five bit output via parallel path 357 to AND-gates 378 and 392, and in turn to AND-gates 374 and 394, respectively, which gates 374 and 394 control the state of flip-flop 386 to provide the vertical sync output via path 1238 to logic inverter 391, as well as the five bit data output on path 357. The output on path 357 is also fed as an input to AND-gate 372 to provide a reset pulse for counters 320 and 318 and a clock pulse for flip-flop 360 when all input conditions are met. A one bit (first) output is provided on path 1240, a three bit (third, fourth and fifth) output is provided on paths 1242a, 1242b and 1242c, and a four bit output (first, second, fourth and fifth) is provided on paths 1244a, 1244b, 1244c and 1244d. Flip-Flop 360 controls the operation of the device to coordinate the horizontal and vertical reset signals to occur at the proper intervals. The balance of the video data generator circuitry is conventional and will not be described in greater detail hereinafter as its operation will be readily understood by one of ordinary skill in the art, the horizontal and vertical line counters 316 and 320 and the raster row counter 318, preferably, counting cyclically so as to properly synchronize the video signal.

Summary of Operation

Now summarizing the operation of the routing network 10. The function control condition responsive logic network 438 is placed in the "READY FOR DATA" state 0–0 initial condition. A clock pulse from clock 476 is provided to the function control network 438, which network 438 is responsive to the input condition of the output registers 482 and 484 being empty and one of the input registers 478, 480 or 618 being full. When this condition occurs, network 438 permits the Line Output Register 484 to be loaded when the data is not from the computer 84, and the Hard Copy Output Register 482 to be loaded when the hard copy device 200 is on. If the output registers 482 and 484 are not empty, or none of the input registers 478, 480 or 618 is full, no action is taken by the function control network 438. Line output register 484 is not loaded if the data is from the computer 84 but all other actions occur. The state counter 648 is pulsed and the control state is changed from 0–0 to the "CHARACTER RECEIVED" 0–1 state after the conditions have been met.

When the function control network 438 receives another clock pulse from clock 476, if the memory 630 is available for loading and data is being sent, the memory 630 is loaded. If data is not present, or the memory 630 is not available for loading, no action is taken. The state counter 648 is again pulsed and the function control state is changed to the 1–0 "-DATA STORED" state only if the memory was available for loading.

When another clock pulse from clock 476 is emitted to the function control network 438, which is now in the 1–0 state, if data is present, the cursor position counter 646 is advanced; if a control signal and not data is present, then the control, which can include changing the position of the counters 646 and 642, is executed. The state counter 648 is again pulsed to change state to the 1—1 "CURSOR OR OTHER CONTROL SET" state.

When another clock pulse from clock 476 is emitted to the function control network 438, which is now in the 1—1 state the input registers 478 and 480, and the input buffer 618 are cleared. The state counter is pulsed again to return to the 0—0 "READY FOR NEW DATA" state and the iterative multifunction control loop is completed.

By utilizing the multifunction routing network of the present invention a multiplicity of operations may be performed such as displaying keyboard information on an audiovisual television display device either separately or in conjunction with video tape supplied data or computer supplied data, controlling external devices from remote locations in accordance with a preselected scheme, actuating a hard copy device to print out computer supplied data, or combining several of these functions to perform a unitary task such as programmed instruction. A preferred arrangement when the routing network 10 is utilized to provide programmed instruction is to have the video tape device contain the lesson information, including questions thereto and control information, the keyboard device be utilized to input answers to questions appearing on the video tape and the computer be utilized to compare the correct answer to the questions with the student answers and either require portions of the lesson to be replayed, or supplementary portions of the lesson to be added, or the student to respond again until he reaches the correct answer, both the questions and answers appearing on the television screen.

As used throughout the specification the term "data control signal" is defined as both a signal or condition, both terms being used interchangeably, which directly affects the loading, shifting, storing, unloading or display of data; and the term nondata execute control signal is defined as a signal, or condition, both terms again being used interchangeably, which either indirectly affects data or affects the control operation of a device.

It is to be understood that the above described embodiment of the invention is merely illustrative of the principles thereof and numerous modifications and embodiments of the invention may be derived within the spirit and scope thereof.

What is claimed is:

1. A multifunction routing network comprising:

multistable means having a plurality of states including an initial state;

means for changing the state of said multistable means operatively associated with said multistable means;

function control means having a plurality of input conditions and a plurality of output conditions, said output conditions including a data control signal output condition and a nondata execute control signal output condition, said function control means including condition responsive logic means and means for providing a clock pulse for enabling said condition responsive logic means operatively connected to said logic means, said multistable means being operatively connected to said logic means for providing an input condition indicative of the state of said multistable means to said function control logic means, said function control output conditions being determined by said input conditions and said state of said multistable means;

register means, said register means being operatively connected to said function control logic means for providing a signal input condition and a register state input condition to said logic means, said signal input condition including a data signal input condition and a control signal input condition; and memory means having a memory state input condition including a data condition, said memory means being operatively connected to said register means and said function control logic means, said memory means being responsive to said data control signal output conditions;

said condition responsive logic means being responsive to said clock pulse, said multistable means initial state and said register state input condition for providing a first data control signal output condition and a change state first execute control signal output condition, said register means being responsive to said first data control signal output condition, and said state changing means being responsive to said change state first execute control signal to change said multistable means to a second state; said logic means being responsive to said clock pulse, said multistable means second state, said register data signal input condition and said memory state input condition for providing a load memory third data control signal output condition and another change state second execute control signal output condition, said memory means being responsive to said third data control signal output condition to place said memory means in said data condition, and said state changing means being responsive to said change state second execute control signal output condition to change said multistable means to a third state; said logic means being responsive to said clock pulse, said multistable means third state and said register signal condition for providing a fourth data control signal output condition responsive to said register data signal input condition and a third execute control signal output condition responsive to said register control signal input condition, and for providing another change state fourth execute control signal output condition, said state changing means being responsive to said change state fourth execute control signal output condition to change said multistable means to a fourth state, said fourth state corresponding to said initial state whereby an iterative multifunction control loop is provided for said function control means.

2. A multifunction routing network in accordance with claim 1 wherein said network includes video display means operatively connected to said memory means and said function control logic means for providing a video display of said data condition of said memory means.

3. A multifunction routing network in accordance with claim 2 wherein said network further includes a video information source operatively connected to said register means for providing said register signal input condition to said register means, said register means being further operatively connected to said memory means for placing said memory means in said data condition responsive to load memory third data control signal output condition.

4. A multifunction routing network in accordance with claim 3 wherein said video information source includes a means for storing video and audio data signal information and for providing said register data signal input condition from said stored data information.

5. A multifunction routing network in accordance with claim 4 wherein said video information source storage means further includes control signal information for providing said register control signal input condition from said stored control signal information.

6. A multifunction routing network in accordance with claim 4 wherein said video information source includes an information storage means for storing said data information and an information retrieval means for providing said register data signal input condition, said retrieval means having a plurality of distinct operational modes, said distinct operational mode being dependent on said third execute control signal output condition.

7. A multifunction routing network in accordance with claim 2 wherein said network further includes computer means operatively connected to said register means and said function control logic means for providing said register signal condition.

8. A multifunction network in accordance with claim 2 wherein said network further includes input data means for varying said memory data condition, said input data means being operatively connected to said register means, said memory means and said function control logic means.

9. A multifunction network in accordance with claim 8 wherein said input data means is a keyboard input device having a plurality of input keys.

10. A multifunction network in accordance with claim 8 wherein said network further includes computer means operatively connected to said register means and said function control logic means for providing said register signal condition, said input data means including means for accessing said computer means with input data information, said computer means providing a signal input condition to said register means dependent on said access input data information.

11. A multifunction routing network in accordance with claim 10 wherein said computer signal input condition is said register control signal input condition.

12. A multifunction routing network in accordance with claim 11 wherein said network further includes a video information source having an information storage means for storing video and audio data information and an information retrieval means for providing said register data signal input condition, said retrievable means having a plurality of distinct operational modes, said distinct operational mode being dependent on said computer means control signal input condition and said resulting third execute control signal output condition.

13. A multifunction routing network in accordance with claim 2 wherein said video display means includes video data generation means operatively connected to a cathode ray display means, to said memory means and to said function control logic means.

14. A multifunction routing network in accordance with claim 13 wherein said video data generation means includes blanking means including condition responsive logic control means having an output condition operatively connected to said cathode ray display means and said function control logic means to provide a control signal input condition, said function control logic means being responsive to said blanking means logic control means output condition, said clock pulse and said multistable means second state for providing said load memory third data control signal output condition.

15. A multifunction routing network in accordance with claim 3 wherein said network further includes video and audio switch means operatively connected to said function control logic means to said video display means and to a plurality of video input means and audio input means including said video information source, said video display means including audio output means, said video information source including an audio information source, said video and audio switch means segregating said video and audio information signal inputs, respectively, to provide unitary audio and video signal input conditions, respectively to said video display means from said plurality of inputs.

16. A multifunction routing network in accordance with claim 15 wherein said network includes bistable means operatively connected to said function control logic means and said video and audio switch means to control the operation of said video and audio switch means and computer means having an audio data mode and a digital data mode operatively connected to said register means and said function control logic means for providing said register signal input condition, said computer means providing a register control signal input condition for said computer audio data mode, said bistable means being responsive to said third execute control signal output condition to determine said state of said bistable means, said bistable means enabling said video and audio switch means to place said video display audio output means in an audio signal input condition for said computer audio data mode.

17. A multifunction routing network in accordance with claim 1 wherein said network includes bistable means operatively connected to said function control logic means, said bistable means having two states and being responsive to said third execute control signal output condition to determine said state of said bistable means.

18. A multifunction routing network in accordance with claim 1 wherein said logic means is responsive to said clock pulse and said multistable means fourth state for providing a clear register fifth data control signal output condition, said register means being responsive to said clear register fifth data control signal output condition to clear said register means.

19. A multifunction routing network in accordance with claim 1 wherein said memory means has a plurality of changeable data storage positions, said network further includes means for changing said memory means data storage position operatively connected between said memory means and said function control logic means, said data storage position changing means being responsive to said fourth data control signal to change said memory means data storage position.

20. A multifunction routing network in accordance with claim 1 wherein said register means includes an input register means having a state input condition and an output register means having a state input condition, said register state input condition comprising said input and output register state input conditions, said output register means being responsive to said first data control signal output condition.

21. A multifunction routing network in accordance with claim 20 wherein said logic means is responsive to said clock pulse and said multistable means fourth state for providing a clear register fifth data control signal output condition, said input register means being responsive to said clear register fifth data control signal output condition to clear said input register means.

22. A multifunction routing network in accordance with claim 20 wherein said output register means includes a hard copy output register means, and said network further includes a hard copy display means operatively connected to said hard copy output register means, said input register means having a data signal input condition, said hard copy output register means being operatively connected to said input register means and said function control means for providing a hard copy display of said input register data signal input condition responsive to said first data control signal output condition.

23. A multifunction routing network in accordance with claim 1 wherein said condition responsive logic means includes decoder means operatively connected to said register means, and condition responsive decoder enabling means operatively connected to said decoder means, said decoder enabling means being responsive to said clock pulse, said multistable means third state and said register signal condition for providing an enable signal output condition, said decoder means being responsive to said enable signal output condition and said register signal input condition for providing said fourth data control signal output condition responsive to said register data signal input condition and said third execute control signal output condition responsive to said register control signal input condition.